US010394540B1

(12) United States Patent
Bentley

(10) Patent No.: US 10,394,540 B1
(45) Date of Patent: Aug. 27, 2019

(54) SOFTWARE INCREMENTAL LOADER

(71) Applicant: Time Warner Cable Inc., New York, NY (US)

(72) Inventor: James Bentley, Colorado Springs, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 221 days.

(21) Appl. No.: 13/666,175

(22) Filed: Nov. 1, 2012

(51) Int. Cl.
*G06F 8/61* (2018.01)
*G06F 8/65* (2018.01)

(52) U.S. Cl.
CPC . *G06F 8/61* (2013.01); *G06F 8/65* (2013.01)

(58) Field of Classification Search
CPC ..... G06F 8/65; G06F 8/67; G06F 8/68; G06F 8/71; H04L 29/06
USPC .......................................................... 717/171
See application file for complete search history.

(56) References Cited

U.S. PATENT DOCUMENTS 6,151,643 A * 11/2000 Cheng ....................... G06F 8/62 709/200
6,813,778 B1 * 11/2004 Poli et al. ..................... 725/132
2002/0059645 A1 * 5/2002 Soepenberg ......... H04N 5/4401 725/137
2003/0056217 A1 3/2003 Brooks
2006/0161898 A1 * 7/2006 Bauman .................... G06F 8/61 717/127
2007/0022459 A1 1/2007 Gaebel, Jr. et al.
2007/0217436 A1 9/2007 Markley et al.
2008/0134165 A1 * 6/2008 Anderson et al. ............ 717/173
2010/0269146 A1 * 10/2010 Britt ............................. 725/110
2011/0145809 A1 * 6/2011 Hwang ..................... G06F 8/65 717/173
2012/0094643 A1 * 4/2012 Brisebois ............. H04W 8/245 455/418
2014/0007057 A1 * 1/2014 Gill .......................... G06F 8/61 717/126

FOREIGN PATENT DOCUMENTS

WO WO2012007039 A1 * 1/2012 ............. G06F 11/14

OTHER PUBLICATIONS fedora, "Chapter 5. Package Dependencies", Jun. 11, 2010, fedora, 5 pages. (Year: 2010).*

(Continued)

*Primary Examiner* — Bing Zhao
*Assistant Examiner* — Hui-Wen Lin
(74) *Attorney, Agent, or Firm* — Otterstedt, Wallace & Kammer, LLP

(57) ABSTRACT

A method for provisioning consumer premises equipment includes communicating identification information to a software management system via a network interface, receiving a list of bundles in response to communicating the identification to the software management system via the network interface, determining a location of a repository storing at least one bundle in the list, wherein the software management system includes a plurality of repositories storing a plurality of bundles at different locations, and installing, by the consumer premises equipment, the at least one bundle from the repository having the location.

15 Claims, 14 Drawing Sheets

(56) References Cited

OTHER PUBLICATIONS fedora, "Defining Package Information", Feb. 4, 2011, fedora, 4 pages. (Year: 2011).*
fedora, "4.2.7. Listing the scripts in a package", May 26, 2012, fedora, 2 pages. (Year: 2012).*
Open Cable Application Platform (OCAP) 1.1.3, CableLabs, OC-SP-OCAP1.1.3-100603.pdf, Jun. 2012.
R. Fielding et al., Hypertext Transfer Protocol, 1.1, Internet Engineering Task Force, http://www.ietf.org/rfc/rfc2616.txt, Jun. 1999.

* cited by examiner

```
<jar basedir="${dir.output}/classes/showlist"
destfile="${dir.output}/classes/showlist/showlist.jar"
includes="com/**,resources/**"
excludes="resrources/*.bls" />
```

*FIG. 14*

```
Manifest-Version: 1.0
Main-Class: com.twc.ocapx.cpc.impl.CPCXlet
Bundle-Vendor: TWC
Bundle-Version: 1.0.0
Bundle-Name: ContentPresentation
Bundle-ManifestVersion: 2
Bundle-SymbolicName: ContentPresentation
Launch-Priority: 2
Import-Package: com.twc.ocap.util.data, com.twc.ocap.util.hardware,
com.twc.ocap.util.sort, com.twc.ocapx, com.twc.ocapx.binlog, javax.media,
javax.tv.service, javax.tv.service.navigation, javax.tv.service.selection,
javax.tv.xlet, org.davic.net.tuning, org.dvb.media, org.dvb.
user, org.havi.ui, org.ocap.dvr, org.ocap.media, org.ocap.net, org.oc
ap.shared.dvr, org.ocap.shared.dvr.navigation, org.ocap.system
Export-Package: com.twc.ocapx.cpc
```

*FIG. 15*

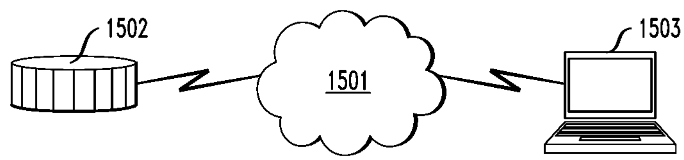

*FIG. 16*

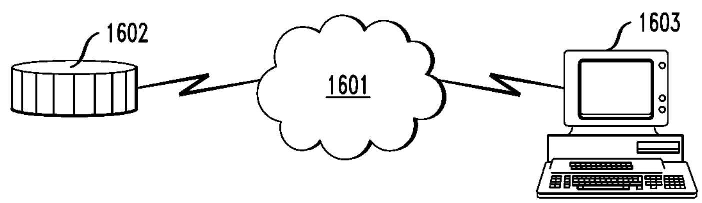

SOFTWARE INCREMENTAL LOADER

BACKGROUND

1. Technical Field

The present disclosure relates generally to communications networks, such as video content networks, and, more particularly, to provisioning techniques for such networks and the like.

2. Description of Related Art

Provisioning is the process of preparing and equipping a communications network to allow it to provide services to its users. In a video content network, consumer premises equipment (CPE), such as set-top terminals (STTs, also referred to as set-top boxes or STBs), may be provisioned by downloading applications and the like from an upstream node; for example, a head end. Some systems employ the OpenCable Application Platform (OCAP), which is an operating system layer designed for consumer electronics that connect to a cable television system. Digital storage media command and control (DSM-CC) is a toolkit for developing control channels associated with MPEG-1 and MPEG-2 streams.

OCAP uses a DSM-CC Object Carousel (OC) to deliver applications to a set top box. The OC is a virtual file system. It defines path like structures to individual files. OCAP leverages this specification to construct application locators (in Universal Resource Locator—URL—form).

Software resident on the CPE periodically checks with the DSM-CC OC for updates. Further, each CPE provides a mechanism by which users can manually check for updates. When updates are found, they may be downloaded and installed. This process requires CPE reboot.

SUMMARY

According to an exemplary embodiment of the present disclosure, a method includes communicating, by consumer premises equipment, identification information to a software management system via a network interface, receiving, by the consumer premises equipment, a list of bundles in response to communicating the identification to the software management system via the network interface, determining, by the consumer premises equipment, a location of a repository storing at least one bundle in the list, wherein the software management system includes a plurality of repositories storing a plurality of bundles at different locations, and installing, by the consumer premises equipment, the at least one bundle from the repository having the location.

According to an exemplary embodiment of the present disclosure, a method for managing software provisioned on consumer premises equipment includes receiving, by a central repository, identification information of a consumer premises equipment via a network interface, and generating, by the central repository, a list of bundles stored in one or more sub-repositories in response to receiving the identification information via the network interface, wherein the one or more sub-repositories are in signal communication with the central repository.

According to an exemplary embodiment of the present disclosure, a software management system includes a first central repository, a plurality of sub-repositories in signal communication with the first central repository, a plurality of bundles stored in different ones of the sub-repositories by the first central repository, wherein each bundle is associated with a description, and a computer program product embodying instructions executable by the first central repository to perform a method for receiving identification information of a consumer premises equipment and generating a list of bundles for the consumer premises equipment selected from the bundles stored in different ones of the sub-repositories based on the identification information, wherein the bundles include information for installing incremental updates to the consumer premises equipment.

In another embodiment, exemplary consumer premises equipment includes at least one hardware processor; and at least one memory coupled to the at least one processor. The at least one processor is operative to carry out or otherwise facilitate any one, some, or all of the method steps described herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the disclosure or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the disclosure or elements thereof can be implemented in the form of an apparatus including a memory and at least one processor that is coupled to the memory and operative to perform, or facilitate performance of, exemplary method steps. Yet further, in one or more embodiments of the disclosure, elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Techniques of the present disclosure can provide substantial beneficial technical effects. For example, one or more embodiments of the disclosure allow for a larger number of applications and or resources to be delivered to a set top box utilizing less network bandwidth. One or more embodiments of the disclosure enable applications to be updated without requiring the set top box to be rebooted. Further, one or more embodiments of the disclosure allow the set top box to store, locally, more data and applications. One or more embodiments of the disclosure provide a significantly improved technique for delivering and managing applications that are executed on a set top box.

These and other features and advantages of the present disclosure will become apparent from the following detailed description of illustrative embodiments thereof, which is to be read in connection with the accompanying drawings.

BRIEF DESCRIPTION OF THE DRAWINGS

FIG. 14 shows an exemplary bundle's manifest file, according to an embodiment of the disclosure;

FIG. 15 shows an exemplary cellular-based system, according to an embodiment of the disclosure;

FIG. 16 shows an exemplary internet protocol-based system, according to an embodiment of the disclosure;

DETAILED DESCRIPTION

Exemplary embodiments of the present disclosure relate to a Software Incremental Loader (SILo). The SILo is a dynamic deployment system for software components. The SILo may enable management of multiple software repositories, access to the managed repositories, management of repository contents, services for listing repository contents, etc.

According to an embodiment of the present disclosure, an OCAP Digital Navigator (ODN) product includes a plurality of independent software components. Each software component, referred to herein as a bundle, is in-field upgradable. That is, bundles may be updated independently and without requiring a reboot of the CPE.

The SILo is a collection of repositories of bundles. Each bundle represents an incremental change that can be applied to one or more devices. Distribution of the software bundles from the SILo may use additional services, for example, a bundle source and a bundle handler. Together, these services determine which changes need to be applied to a given device. More particularly, the bundle source manages bundle handler access to the SILo. The bundle handler is software that executes on a CPE to apply changes to the CPE. The bundle handler communicates with the bundle source in order to determine what changes need to be applied to the CPE in which the bundle handler is executing.

Herein, embodiments of the present disclosure are described in the context of a provisioning system and method, and subsequently as a provisioning system embodying an exemplary SILo.

Embodiments of the disclosure may be implemented in a variety of contexts. Purely by way of example and not limitation, some embodiments will be shown in the context of a cable multi-service operator (MSO). Another embodiment will be shown in the context of a satellite system.

Figure 1:
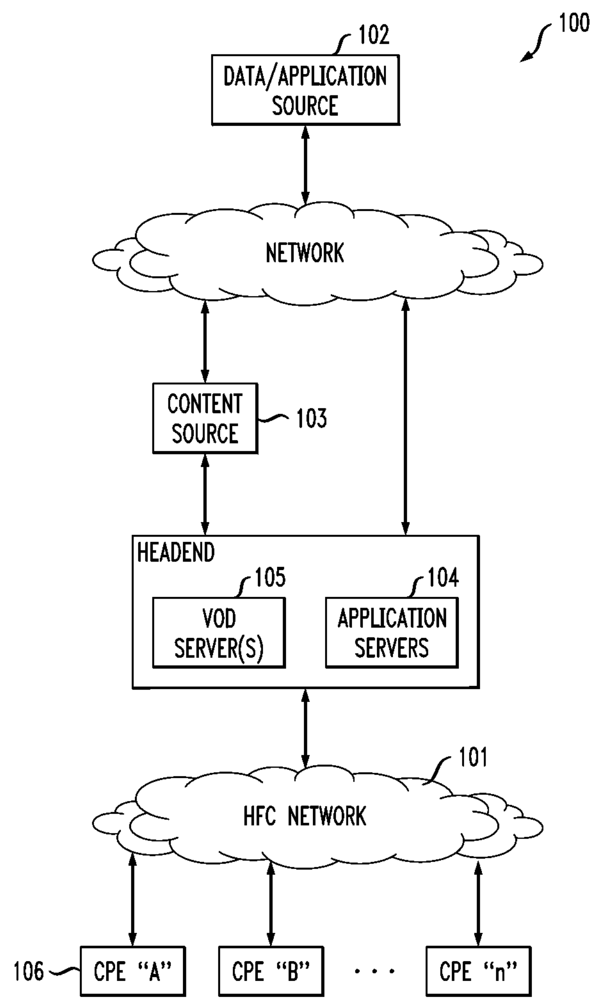
FIG. 1 is a functional block diagram illustrating an exemplary hybrid fiber-coaxial (HFC) network configuration useful with one or more embodiments of the present disclosure.

Initially, the complete disclosure of United States Patent Application 2008/0134165 by Anderson et al., entitled "Methods and apparatus for software provisioning of a network device," and published on Jun. 5, 2008, is herein incorporated by reference in its entirety for all purposes. FIG. 1 illustrates a typical content-based network configuration 100 with which techniques of the present disclosure may be used. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) e.g., 106. The distribution server(s) 104, VOD servers 105 and CPE(s) 106 may be connected via a bearer network 101 (e.g., HFC). An exemplary architecture is shown in FIG. 1 for illustrative brevity, although it will be recognized that comparable architectures with multiple origination points, distribution servers, VOD servers, and/or CPE devices (as well as different network topologies) may be utilized consistent with the disclosure. For example, the head-end architecture of FIG. 2 (described in greater detail below) may be used.

Figure 10:
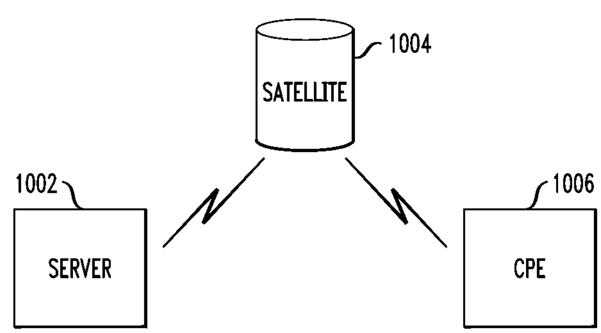
FIG. 10 is a block diagram of an exemplary system in the context of a satellite network, in accordance with an embodiment of the disclosure.

It should be noted that in addition to an HFC network or a switched digital network as discussed below, other kinds of video content networks can be employed for network 101, including a satellite network as shown in FIG. 10, a fiber-to-the-home (FTTH) or fiber-to-the-curb (FTTC) network, etc.

The data/application origination point 102 comprises any medium that allows data and/or applications (such as a VOD-based or "Watch TV" application) to be transferred to a distribution server 104. This can include for example a third party data source, an application vendor website, a compact disk read-only memory (CD-ROM), an external network interface, a mass storage device (e.g., a Redundant Arrays of Independent/Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill in the art.

The application distribution server 104 comprises a computer system where such applications can enter the network system. Distribution servers are well known in the networking arts, and accordingly are not described further.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104.

Figure 2:
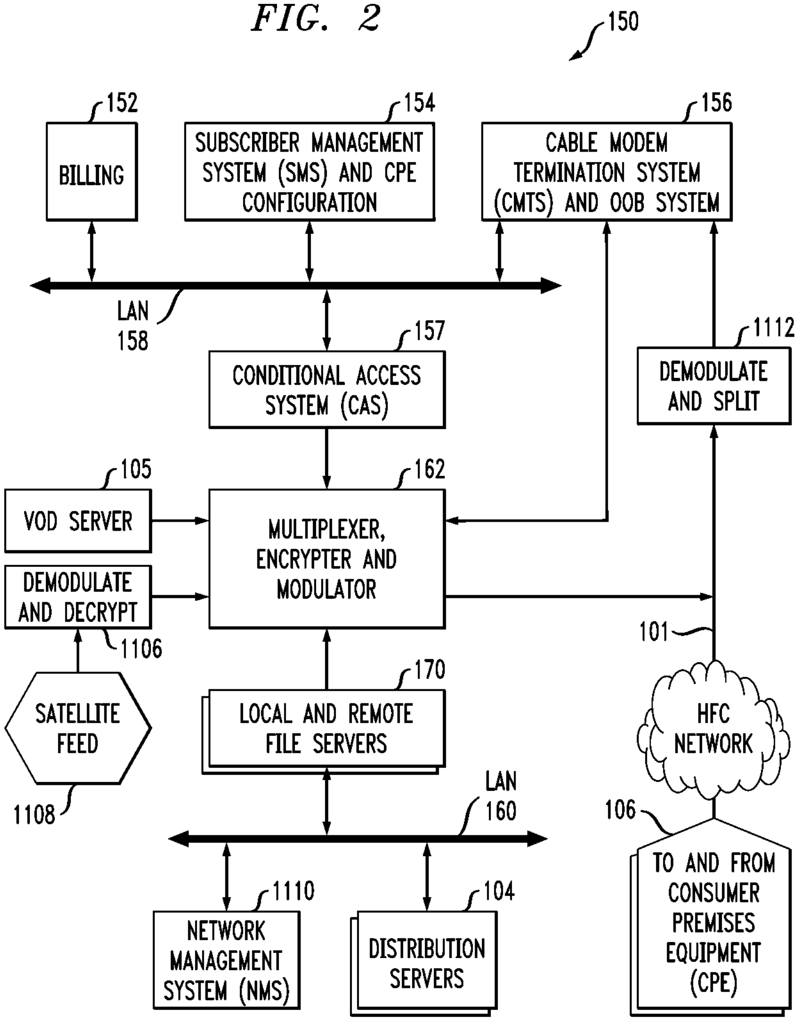
FIG. 2 is a functional block diagram illustrating one exemplary HFC cable network head-end configuration useful with one or more embodiments of the present disclosure.

Referring now to FIG. 2, one exemplary embodiment of a head-end architecture useful with the present invention is described. As shown in FIG. 2, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the disclosure. It will also be appreciated that the head-end configuration depicted in FIG. 2 is high-level, conceptual architecture and that each multi-service operator or multiple system operator (MSO) may have multiple head-ends deployed using custom architectures.

The architecture 150 of FIG. 2 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 3) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience. The OpenCable™ Application Platform (OCAP) 1.0, 2.0, 3.0 (and subsequent) specification (Cable Television laboratories Inc.) provides for exemplary networking protocols both downstream and upstream, although the disclosure is in no way limited to these approaches. The DOCSIS Set-top Gateway (DSG) Interface Specification, CM-SP-DSG-I19-111117, and the OpenCable™ Application Platform Specifications, OpenCable Application Platform (OCAP), OC-SP-OCAP1.2-110512, both available from the aforementioned Cable Television Laboratories, Inc., are expressly incorporated herein by reference in their entireties for all purposes. Furthermore, the DAVIC 1.0 through 1.5 specifications, inclusive, available from DAVIC, the Digital Audio Video Council, are also expressly incorporated herein by reference in their entireties for all purposes.

It will also be recognized that multiple servers (broadcast, VOD, or otherwise) can be used, and disposed at two or more different locations if desired, such as being part of different server farms. These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some examples, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 3:
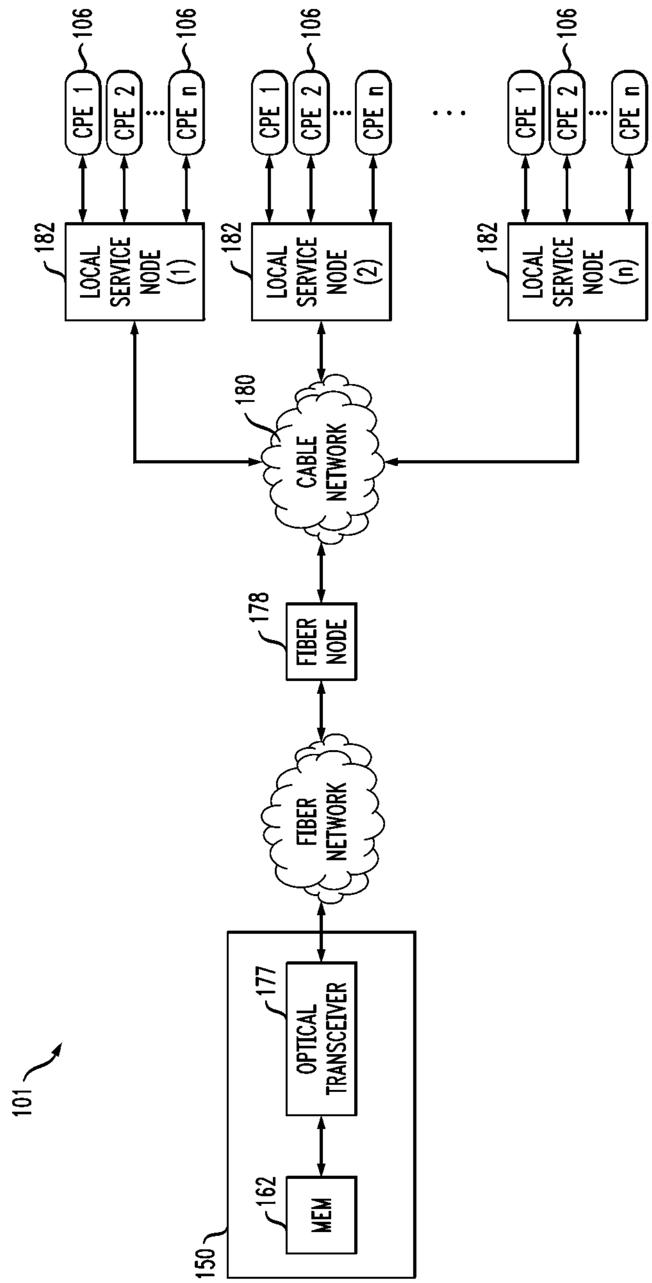
FIG. 3 is a functional block diagram illustrating one exemplary local service node configuration useful with one or more embodiments of the present disclosure.

As shown in FIG. 3, the network 101 of FIGS. 1 and 2 comprises a fiber/coax arrangement wherein the output of the MEM 162 of FIG. 2 is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Figure 4:
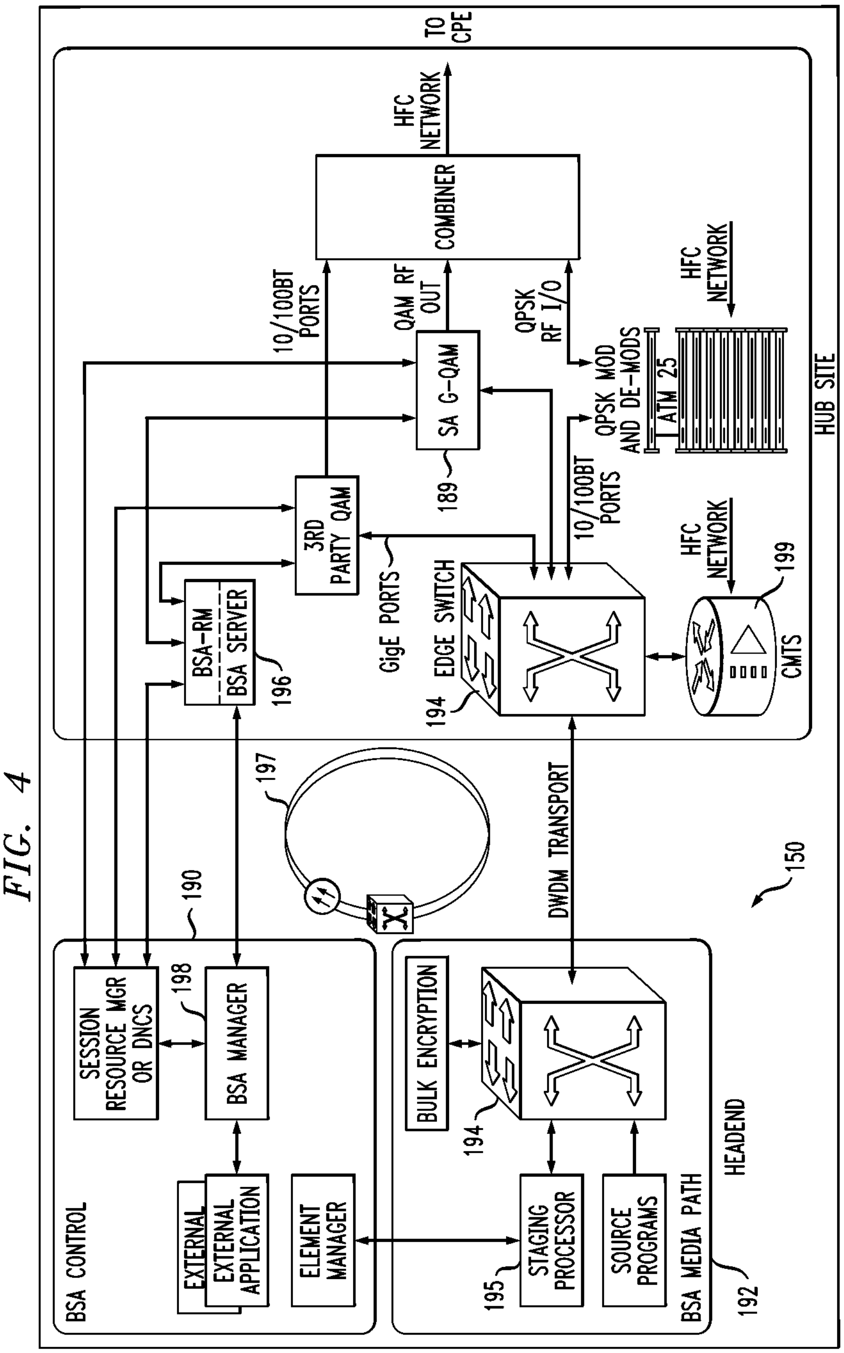
FIG. 4 is a functional block diagram illustrating one exemplary broadcast switched architecture (BSA) network useful with one or more embodiments of the present disclosure.

FIG. 4 illustrates an exemplary "switched" network architecture also useful with one or more embodiments of the present invention. While a broadcast switched architecture (BSA) network is illustrated in this exemplary embodiment, it will be recognized that the present disclosure is in no way limited to such architectures.

Switching architectures allow efficient bandwidth use for digital broadcast programs. The subscriber may be unaware of any difference between programs delivered using a switched network and ordinary streaming broadcast delivery.

FIG. 4 shows the implementation details of one exemplary embodiment of this broadcast switched network architecture. Specifically, the head-end 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

US Patent Publication 2003/0056217 by Paul D. Brooks, entitled "Technique for Effectively Providing Program Material in a Cable Television System," and published on Mar. 20, 2003, the complete disclosure of which is herein incorporated by reference for all purposes, describes one exemplary broadcast switched digital architecture useful with one or more embodiments of the present invention, although it will be recognized by those of ordinary skill that other approaches and architectures may be substituted.

In addition to broadcast content (e.g., video programming), the systems of FIGS. 1-4 may also deliver Internet data services using the Internet Protocol (IP), although other protocols and transport mechanisms of the type well known in the digital communication art may be substituted. One exemplary delivery paradigm comprises delivering MPEG-based video content, with the video transported to user personal computers (PCs) (or IP-based STBs) over DOCSIS channels comprising MPEG (or other video codec such as H.264 or AVC) over IP (Internet Protocol) over MPEG. That is, the higher layer MPEG or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 4, the IP packets associated with Internet services may be received by edge switch 194, and forwarded to the cable modem termination system (CMTS) 199. The CMTS may examine the packets, and forward packets intended for the local network to the edge switch 194. Other packets may be discarded or routed to another component. Note also that edge switch 194 in block 150 in FIG. 4 may be, in the most general case, the same or different as that shown in the hub site of FIG. 4. Also, in other embodiments, CMTS 199 may be located in a place other than the hub site.

The edge switch 194 may forward the packets received from the CMTS 199 to the QAM modulator 189, which may transmit the packets on one or more physical (QAM-modulated RF) channels to the CPEs. The IP packets are typically transmitted on RF channels that are different that the RF channels used for the broadcast video and audio programming, although this is not a requirement. The CPE 106 may each be configured to monitor the particular assigned RF channel (such as via a port or socket ID/address, or other such mechanism) for IP packets intended for the subscriber premises/address that they serve.

It will be appreciated that while some examples presented herein are described in the context of Internet services that include multicast and unicast data, other examples could involve other types of services that include multicast transmission of data delivered over a network having multiple physical channels or even virtual or logical channels. For example, switching between various physical channels that comprise a virtual channel, can itself be conducted according to the switched approach. As a simple illustration, if a first virtual channel is comprised of physical channels (e.g., QAMs) A, B and D, and a second virtual channel is comprised of QAMs C, E and F, a cable modem (CM) or other CPE can be configured to switch between the A/B/D and C/E/F virtual channels as if they were a single QAM.

The configurations shown in FIGS. 1-4 are exemplary in nature and different approaches may be used in other embodiments; such other approaches may have more or less functionality (for example, high speed Internet data services might be omitted in some cases).

Figure 5:
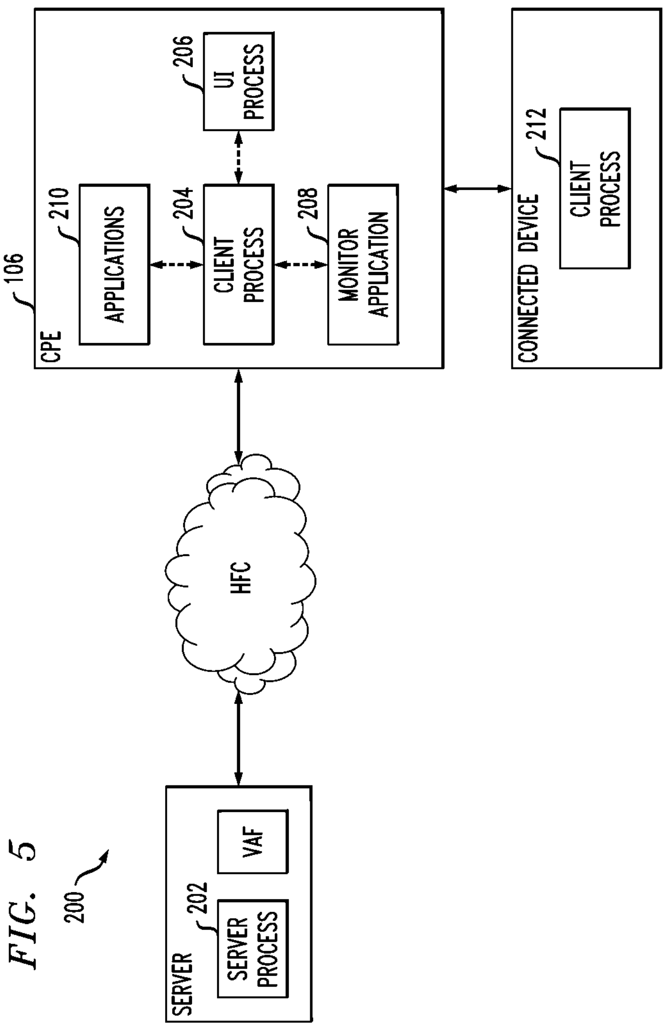
FIG. 5 is a functional block diagram depicting an illustrative software provisioning architecture in which techniques of the present disclosure may be used.

FIG. 5 illustrates one exemplary embodiment of a generalized software provisioning architecture. As shown in FIG. 5, the architecture 200 includes a server process 202, which may be disposed for example on a server or other device at the head-end 150 of the network, at a BSA switching hub (see FIG. 4), or yet other location as desired. The server functionality may be integrated with one or more other existing components (e.g., an application server 104 as shown in FIG. 1). By disposing the server process 202 at the head-end, BSA hub, or some other node with connectivity to multiple CPE, the server process may service and provision multiple CPEs 106 simultaneously.

The server functionality may be provided by a number of existing components and/or processes already in place within the network, such as for example use of existing messaging facilities to generate and deliver the update messages, the use of a carousel function to select and download applications or other components, and so forth. Each of the foregoing features is described in greater detail subsequently herein.

As shown in FIG. 5, a corresponding client process 204 is disposed on each CPE 106 (or a selected subset of all CPE); this process allows the CPE 106 to receive/send information from/to the server process 202, for e.g., determining the need for provisioning, requesting a list of bundles from the SILo, remote configuration and provisioning of the CPE 106, monitoring of operations, statistics, status information, and the like.

The client portion 204 may also be in logical communication with other processes within the CPE, such as for example an OCAP-compliant monitor application or middleware 208, a user interface (and configuration) process 206, other applications 210 running on the CPE, and the like. Client processes 212 on other devices, such as a device coupled to the CPE 106 via a wireless or networking interface, can also communicate with the client process 204 if desired.

The CPE 106 may also include various other processes, such as a media server, web or http server, and so forth. These can be used in a stand-alone fashion (e.g., where a personal media device (PMD) in the premises network merely accesses the media server in order to obtain stored personal content from the CPE 106), or as a local proxy for other distant servers (such as a remote third party web server, and the like). Moreover, the CPE may take any number of forms, including for example a set-top box (e.g., DSTB); a converged device or "hive" as disclosed in US Patent Publication 2007/0217436 of Markley et al, entitled "Methods and apparatus for centralized content and data delivery," the complete disclosure of which is expressly incorporated herein by reference in its entirety for all purposes; a wireless satellite receiver; or the like. All of the foregoing embodiments are non-limiting examples of optional extra functionality. One or more embodiments are generally applicable to OCAP (over US or Korean cable, e.g.) or Multimedia Home Platform (MHP) (over satellite, e.g.) television terminals. The DVB Project's Digital Video Broadcasting (DVB) Multimedia Home Platform (MHP) Specification 1.2 is expressly incorporated herein by reference in its entirety for all purposes, as are all other versions of same.

Figure 6:
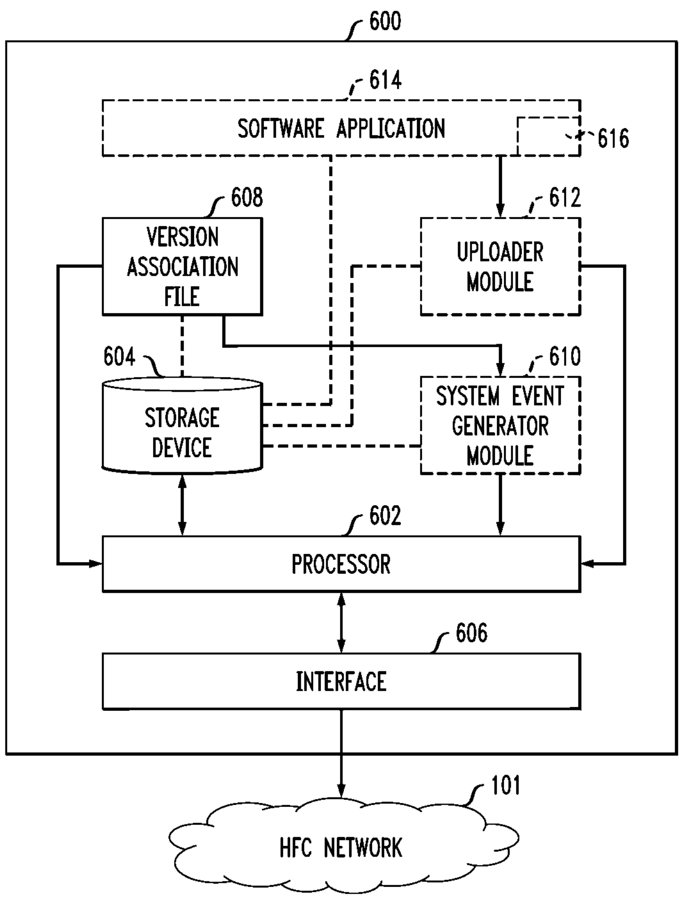
FIG. 6 is a functional block diagram of a server configured to provision CPE software.

FIG. 6 is a functional block diagram of an exemplary server 600 configured to transmit a software application 614 or other components to a CPE 106. A processor 602 resident on the server 600 is in data communication with a network interface 606 and a storage device 604. The storage device 604 comprises a non-volatile memory device such as a hard disk that is electrically coupled to the processor 602. Resident on the Storage Device 604 is a Version Association File (VAF) 608 or other comparable data structure that maps an application version 616 of a given software application 614 to a range of addresses corresponding to those CPE 106 that have been designated for that application version 616.

A system event generator module 610 is also present on the storage device 604. The system event generator module 610 may broadcast a DSM-CC catalog update message over the HFC Network 101 upon a modification to the Version Association File 608. The DSM-CC Catalog Update message may be transmitted to the CPE 106 along with the Version Association File 608 (or the two may be sent independently but in a contemporaneous fashion). In other examples, only the DSM-CC catalog update message is sent to the CPE 106 upon a modification to the Version Association File 608. Of course, the disclosure is not limited to DSM-CC messages. For example, as an alternative (or in addition) to a DSM-CC message, an IP message can be used.

The software application 614 is present on the storage device 604 of the server, along with an uploader module 612 that is used to broadcast the application version 616 of the software application 614 over the HFC network 101. The CPE 106 downloads the application version 616 of the software application 614 if that CPE has been designated in the Version Association File 608 (for example, by address, MAC, TUNER ID, TUNER USE, opaque variable, etc.) and the application version 616 of the software application 614 is not already present on the CPE 106. US Patent Publication 2007/0022459 of Gaebel et al., entitled "Method and apparatus for boundary-based network operation," the complete disclosure of which is expressly incorporated herein by reference in its entirety for all purposes, describes exemplary approaches for implementing TUNER USE, TUNER ID, and opaque variables.

In one variant, the Version Association File 608 contains at least six fields: (i) an ORG ID, (ii) an App ID, (iii) an App Type, (iv) a Launch Order, (v) a Target Type, and (v) Targets. These fields are described in the aforementioned Anderson et al. publication 2008/0134165.

Figure 7:
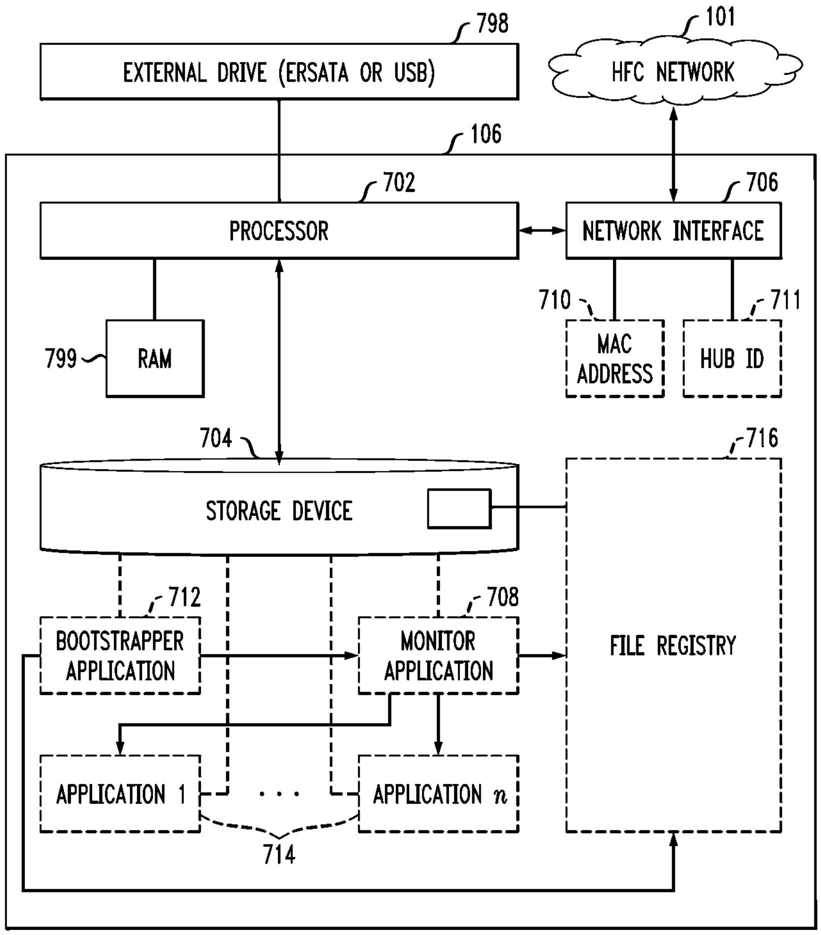
FIG. 7 is a functional block diagram depicting exemplary customer premises equipment.

FIG. 7 illustrates a functional block diagram of an exemplary CPE 106 configured to implement the download and provisioning methods. As shown in FIG. 7, a processor 702 resident on the CPE 106 is in data communication with the network interface 706 and a storage device 704. The processor 702 is used to execute instructions such as those instructions used in communicating with the network interface 706 and those instructions used for loading and storing data to the storage device 704, as is well known in the electronic arts. The network interface 706 manages data transmitted and received over, e.g., the HFC Network 101, and comprises the MAC Address 710 and the Hub ID 711. Depending on the network topology and delivery mechanism used, the interface 706 may comprise any number of different modalities including without limitation a radio frequency tuner stage (and de-multiplexer (demux)) of the type well known in the art, a Data Over Cable Service Interface Specification (DOCSIS) or other cable modem, an IP interface, 802.3 Ethernet interface, 802.11 WiFi interface, and so forth. Embodiments of the disclosure are, in general, not limited to any particular type of network. The data, applications, or content received by the CPE 106 via the interface is stored on the storage device 704.

In one embodiment, the storage device 704 is a non-volatile memory device such as a hard disk that is in data communication with the processor 702. Resident on the storage device 704 is a bootstrap application 712, a monitor application 708, a file registry 716, and optionally, one or more of the application versions 616 of one or more software applications 614, 714 previously described. The exemplary file registry 716 is a table of numeric entries assigned to each of the application versions 616 of each of the software applications 614, 714 currently installed in the CPE or connected devices. The aforementioned Anderson et al. Publication 2008/0134165 describes a bootstrap application 712 and monitor application 708. Applications on device 704 may be loaded into RAM 799 to configure the processor 702 to implement appropriate functionality.

OCAP uses a DSM-CC Object Carousel (OC) to deliver applications to a set top box. The OC is a virtual file system. It defines path like structures to individual files. OCAP leverages this specification to construct application locators (in Universal Resource Locator—URL—form).

A compressed file, specifically a Java Archive (JAR), is also a virtual file system. Compressed file data is represented as entries within the JAR.

The URL and carousel descriptors do not support indexing within a file. As such, applications exist, on the OC, in un-compressed form.

As application development continues, the size of the application becomes larger. The existing OC implementations are limited in the amount of bandwidth available to each carousel.

One or more embodiments may provide the capability to deliver applications on an OC in compressed form. Indeed, one or more embodiments may provide a system and/or method for delivering compressed applications on a DSM-CC object carousel.

In one or more embodiments, a small portion of the application, known as the framework, exists on the OC in uncompressed form. The remainder of the application is populated, on the OC, in one or more compressed JAR files.

The framework is responsible for loading and initializing the JAR file(s) necessary to execute the application.

The framework is signaled as the application to launch. The OCAP system then reads this application and launches the framework. The framework then consults a list of JAR files available to load. The framework interrogates the set-top box (e.g., OCAP device or MHP terminal) to determine system capabilities. Based on this information, the framework decides which JAR files should be loaded.

The framework loads and decompresses each JAR file that can be supported by the OCAP device/and/or is available to the OCAP device, into memory. A manifest file, within each JAR file is examined when the JAR file is loaded. The manifest is used to identify JAR initialization classes as well as dependencies. If the dependencies can be met, the framework uses a Java ClassLoader to make classes defined in the JAR file available for use. Once the classes are loaded via the ClassLoader the framework will instantiate the class designated in the manifest file and execute it.

The DSM-CC OC specification may define a method of Object Carousel Compression. This method compresses the entire carousel. The receiving device may then decompress the OC to read the carousel's contents and execute signaled applications. There is currently no way to compress select portions of the carousel file system. This takes both time and memory on the CPE. Consider the compressed module descriptor. Data carousel modules may be compressed to save space in the transport stream. This descriptor indicates that the module has been compressed using the 'zlib' compression scheme. Since this descriptor only refers to modules, it can only be carried in the DII ModuleInfo. With regard to the above reference DII (MPEG) descriptor; this compresses the module in the MPEG stream—the entire carousel.

Since the carousel is decompressed by the OCAP device the applications contained on the OC will be stored in an un-compressed form. However, one or more embodiments ensure that applications may be stored on the OCAP device in compressed form. Application storage may be a finite resource. When applications are stored in compressed form, more storage space is available for the storage of other applications as well as the growth of the product. Note that one or more embodiments allow for correct operation even if the OC is compressed. The prior passage simply points out an alternate, yet inferior, way to deliver compressed applications to a set top box.

The OCAP/MHP system may allow for loading applications via HTTP. The URLs specified in this operation do support indexing in JAR files. The HTTP file system may require two-way communications between the HTTP server and the OCAP device. These communications are typically cumbersome in non-DSG (DOCSIS Set top Gateway) mode—typically referred to as DAVIC two-way communications. As such, the population of devices that can effectively use HTTP loading is dramatically constrained. Applications retrieved via HTTP are typically decompressed by the OCAP device. As such, the applications may be stored on the OCAP device in an un-compressed form. However, one or more embodiments enable applications to be stored on the OCAP device in compressed form.

One or more embodiments are compatible with HTTP deployments.

Figure 8:
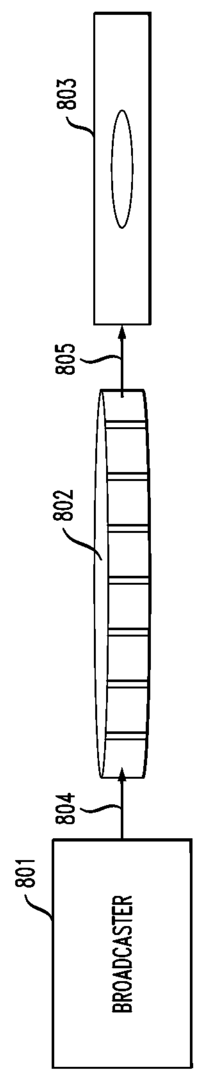
FIG. 8 is a block diagram of an exemplary system, in accordance with an embodiment of the disclosure.

Referring now to FIG. 8, a Transport Stream Broadcaster (TS Broadcaster) 801 may be responsible for generating the Object Carousel and populating it with files. Digital Streaming Media Command and Control Object Carousel (DSM-CC OC) 802 includes a virtual file system delivered in a television MPEG stream. Digital Set Top Box 803 (an example of CPE 106) includes a receiver for television digital media including the DSM-CC OC. As seen at 804, files may be added to the DSM-CC OC 802 by the TS Broadcaster 801. As seen at 805, the files may be received by the Digital Set Top Box and interpreted.

OCAP may specify how to interpret special files on the DSM-CC OC. This includes applications that are to be executed on the set top box. One such application is the framework application. The Digital set top box reads the 'framework' application from the DSM-CC OC and executes it, on the set top box hardware.

When executed, the framework may read files from the DSM-CC OC. A number of these files may be compressed sets of executable applications and libraries. The framework may identify these special files decompresses them to memory on the set top box, interpret the contents of the decompressed files, and execute applications defined within the decompressed files.

Once the framework is executing on the set top box, the framework is free to load and interpret files from the DSM-CC OC and/or any other connected and/or accessible file repository, including a SILo repository as described below. These repositories include files accessible via Hypertext Transfer Protocol (HTTP), file transfer protocol (FTP), local disk storage and/or local memory.

Numerous applications exist for the OCAP environment. One or more embodiments may enable these applications to be made available in compressed form on a DSM-CC OC. One or more embodiments relate to delivering applications, in compressed form, to an OCAP set top box. On the other hand, one or more embodiments relate to adapting existing OCAP applications so that they can be deployed to an OCAP set top box in compressed form.

It may be beneficial to not have to re-compile many of the applications; for example, because they are end-of-life or no longer supported for development. One or more embodiments provide a method for re-packaging OCAP applications to enable delivery, of the application, in a compressed form, on a DSM-CC Object Carousel. Such a method is a simplification of an embodiment wherein an application is repackaged such that it can be deployed on an OC in compressed form. Again, some embodiments provide techniques for delivering applications in compressed form on a DSM-CC OC. Other embodiments provide techniques for converting existing applications—those specifically built to be delivered on a DSM-CC OC in decompressed form—into an application that can be delivered in compressed form.

In one or more embodiments, a small class (BundleXlet) is defined that assumes the role of the initial Xlet for the repackaged application. The original application (OA) is compressed, along with its associated permissions and configuration files, into a Java Archive (JAR) file. The JAR file is then deployed, on the OC, along with the BundleXlet. The OCAP launch configuration, or Application Descriptor, includes all of the specified command line arguments signaled for the OA. However, the Application Descriptor is modified such that the BundleXlet is the class launched.

Upon execution, the BundleXlet makes the contents, of its associated JAR file, available to other applications.

The framework may enable the delivery of applications in compressed form on a DSM-CC OC. The framework understands how to identify and communicate with the BundleXlet. The framework acquires the OA from the BundleXlet. The framework then establishes an XletContext for the OA. This XletContext provides access to the command line arguments, and other properties, defined in the Application Descriptor. The OA is then decompressed into memory. The framework uses a Java Class Loader to load the classes defined in the OA JAR file. The framework then identifies the OA's main class, which was replaced, in the Application Descriptor, by the BundleXlet; instantiates it, and executes it.

One or more embodiments advantageously provide a system for dynamically modifying features of an OCAP application. As used herein, "AIT" means "Application Information Table" and "XAIT" means "Extended Application Information Table." OCAP applications have to be signaled for execution in an application descriptor file, the AIT/XAIT. The OCAP device will reboot, or request a reboot, if the version of an application changes. As such, it is necessary to reset the OCAP device when an application changes.

One or more embodiments provide a system wherein features of an application are dynamically loaded, and bound to one another, when the application is executed. This also allows the features to be un-loaded, un-bound to one another, during the application's execution. As such, individual features can be replaced, while an application is executing, without requiring the device to reboot.

Unfortunately, OCAP devices frequently cache the OC in an attempt to increase OC READ performance. As such, changes on the OC may not be recognized unless the AIT/XAIT changes. For this reason, it is desirable to allow features to be acquired from various alternate locations.

Further, deployment from alternative locations enables acquisition of applications and/or features from non-OCAP environments, such as a generic HTTP server. Deploying applications from an HTTP server allows for a centralized deployment model which significantly reduces deployment costs. Potentially, this deployment model may be employed to offer subscription or other purchasable features and/or applications. For example, a so-called "app store" might be provided wherein subscribers can purchase applications (e.g., video gaming applications) that will run on the set-top box without having to re-boot the device.

Feature management can be broken into two parts. The first part deals with the initial loading of the features. The second part deals with run-time enabling, disabling, adding or replacing features.

When the application is started, it examines a list of features that are available to it. The feature information, contained in the feature list, may include any system dependencies and/or alternate location(s) for the feature code and resources. The application can then load the features that are appropriate for the device (based on system dependencies).

When a feature is loaded, it advertises its services in a common application registry. The feature may also resolve any services it requires from the application registry. Given the dynamic nature of the system, if a feature resolves services, the feature should also listen for changes in the registry.

The registry will notify listeners if services are added or removed. When services are removed, consumers of those services (features) should release their references to the service. This allows the provider of the service (feature) to be safely removed from the system.

If a feature interrogates the registry and does not find a required service, that feature may terminate or provide a reduced set of functionality. The feature may listen for registry changes. If the required services later become available, the feature may then execute properly and/or provide full functionality by resolving the service through the registry. This allows features to be safely installed and/or re-installed into the system.

Feature management may be performed manually, by an operator, or automatically, by executable application code, or both. An operator may retrieve the list of installed features from the application. The operator can then indicate, to the application, which features are to be stopped and/or made unavailable. The operator can further indicate that the feature is to be discarded by the application. The operator may then specify, to the application, the location of features that are to be loaded by the application. The operator interface may be provided via HTML web page, telnet console, or similar mechanisms. The skilled artisan will appreciate that Telnet is an internet protocol used for the purpose of providing remote access to a system. See the IETF's Telnet Protocol Specification RFC 854.

For automatic feature management, the application may monitor for feature revisions. If revisions are found, the application may stop the existing feature and un-load it. The application may then retrieve, load and start the appropriate revision. Note that revisions may be retrieved prior to disabling and un-loading existing features. This allows the revisions to be ready for use in a timely manner (downloaded in the background). Further, the application can determine a safe time for the feature to be replaced (such as when the feature is not in use).

A bundle is a code packaging system. Each bundle includes three basic things: (1) a manifest file, (2) an optional activator and (3) executable code and/or resources. Details regarding each of these bundle components are provided herein.

A bundle is deployed via the framework. The framework uses a deployment descriptor to identify which bundles are to be loaded, and how each bundle is to be loaded. Due to the numerous dependencies, NavigatorXlet is chosen to be the Framework. Exemplary details of its operation are provided herein.

According to an exemplary embodiment of the present disclosure, bundle components of a software application may be distributed among one or more repositories. Each repository may be accessed, by the CPE, in specific ways. For example, components may be deployed directly to a DSM-CC OC 802, where one or more CPE devices have access. The SILo enables the CPE to select software and dynamically build a particular or individual configuration. In this way, different versions of the same software may not be needed for different devices.

It should be understood that the deployment of software components may be performed in-band or out-of-band.

According to an exemplary embodiment of the present disclosure, components may be distributed to HTTP file servers, accessible only to DSG devices.

According to an exemplary embodiment of the present disclosure, software on the CPE may periodically interrogate the SILo to determine what components are available for the CPE. In one alternative, the SILo may notify the CPE device that a new component is available. The SILo and the CPE software may exchange information to configure software on the CPE. Once a new or updated component is identified, the new or updated component may be pushed to the CPE device.

In view of the foregoing, the CPE can obtain new or updated features, service packs, rollbacks, and the like. Here, the SILo may provide dynamic configuration support, e.g., a CPE device may be updated without requiring a reboot of the CPE device.

The ability to store a collection of components among one or more repositories may be useful in the development and deployment of CPE software. Nothing described herein is intended to be limited to broadcast networks. The SILo may be used to support software delivery to connected CPE devices.

The Bundle Manifest File

The bundle manifest file contains information about the bundle. This information can include run-time parameters, version information, and the like. Some notable properties of the manifest file include: specifying the system requirements, specifying the launch priority, and specifying the bundle activator.

System requirements are preferably located in the deployment descriptor so that loading does not occur if the requirements cannot be met.

The launch priority, 'launch-Priority,' is a numeric value between 2 and 255, inclusive. This value indicates, to the framework, when the bundle is to be activated. If no activator is specified, this property has no effect.

The bundle activator is a special class, within the bundle, used to initialize the bundle. This class may be a javax.tv.xlet.Xlet or a com.twc.ocapx.bundling.BundleActivator. When the bundle is loaded, and the appropriate boot stage—relative to the launch priority—is reached, the NavigatorXlet and/or framework will resolve the bundle activator and invoke methods on it to activate the bundle.

The bundle activator is specified by listing the class name, along with its package, in the manifest file. This listing can be made by defining either the 'Main-Class' property or the 'Bundle-Activator' property.

The 'Main-Class' property is defined by JAVA (mark of ORACLE AMERICA, INC. REDWOOD SHORES CALIFORNIA 94065 USA) to make jar files executable. The 'Bundle-Activator' property is defined by OSGi.

FIG. 14 illustrates a bundle's manifest file. The example indicates that the class 'com.twc.ocapx.cpc.impl.CPCXlet' is the bundle activator. It also shows that the launch priority is '2.' Also shown, discussed elsewhere herein, is a listing of imported and exported packages.

Activator Life-Cycle Management

As described, a bundle activator can be a javax.tv.xlet.Xlet or a com.twc.ocapx.bundling.BundleActivator. The type will determine what methods are invoked when the bundle is activated. If the bundle activator implements both Xlet and BundleActivator, its Xlet methods will be invoked.

When the Bundle activator is of type javax.tv.xlet.Xlet, the NavigatorXlet/Framework first calls the class' initXlet method. This is immediately followed by a call to the class' startXlet method—assuming no errors are encountered.

When the Bundle activator is of type com.twc.ocapx.bundling.BundleActivator, the NavigatorXlet/Framework calls the start method of the class.

Whenever a Bundle needs to be stopped, the appropriate method is invoked based on the Bundle activator's type.

The NavigatorXlet/Framework will invoke the activator's destroyXlet method when the bundle is to be stopped, destroyed, and/or un-loaded and the activator is of type javax.tv.xlet.Xlet.

The NavigatorXlet/Framework will invoke the activator's stop method when the bundle is to be stopped, destroyed, and/or un-loaded and the activator is of type com.twc.ocapx.bundling.BundleActivator.

Activator Responsibilities

There are basically three forms that a Bundle can have: (1) library, (2) service or (3) an application. Of course, it is possible for a bundle to provide a mixture of the above forms.

Library

A bundle may provide a set of code that other applications use. In this case, no activator is required.

Service

A bundle may provide one or more services. In this case, the activator should register the services on start and unregister the services when the activator is stopped.

Service registration is supported by associating an object, derived from a class within the bundle, with a 'well known' name (typically the class name of the service). This association is made in the registry (com.twc.ocapx.Registry). Clients use the registry to resolve the object by its name.

The registry also supports a notification mechanism. Listeners are notified when services are added and/or removed from the registry. This notification mechanism allows for bundles to be dynamically loaded and unloaded. Clients are expected to discard references to resolved services when they are removed from the registry.

Application

A bundle may provide one or more applications. When the activator is invoked, the activator may start the applications. The activator is expected to stop all applications, which it started, when the activator is stopped.

Deployment Descriptor

The deployment descriptor is a file that contains a listing of all jar files that the NavigatorXlet/Framework is to load and activate.

In at least some embodiments, the deployment descriptor file is named 'jar.list' and is generated at build time. Each jar is listed, in the file, on a single line. It should be noted that the format of this file may change to accommodate conditional jar loading, based on system dependencies.

Thus, in one or more embodiments, a carousel 802 is used to provision applications down to set-top terminals 803. Currently, the applications are getting bigger and OCAP cannot send compressed applications to the terminals. One or more embodiments allow for getting around that limitation using a bundling technology.

Again, currently, the digital storage media command and control (DSM-CC) specification describes how to transfer data over the object carousel in a cable network. However, it does not provide any way to look into files that are carried on the carousel, and thus, there is no way to deliver compressed files representing code that is organized in some manner. One current scheme compresses the entire carousel but then the receiving device that receives from the carousel has to decompress the entire thing to obtain the files that are on the carousel. Currently, the receiving device (STB) also has to store some of the data because carousels can be slow to read from. Embodiments of the disclosure not only provide a system where code can be delivered in a compressed form, which takes up less bandwidth and therefore transfers faster, but also allow storage of the code on the STB in compressed form so that it takes up less physical memory.

One or more embodiments break the code into small compressed files and/or file systems, and deliver the compressed files onto the STB. The STB then stores the compressed files in their compressed format. To bridge the gap, some of the code, called the framework, remains uncompressed, and that is delivered on the carousel in an uncompressed form. Then, the framework is responsible for identifying all the compressed components that are on the carousel, loading them up, and interpreting the contents, i.e., decompressing them into memory and then executing the code properly. In essence, the system provides a way to reorganize code to overcome lack of capability on the DSM-CC object carousel 802.

Thus, in one or more embodiments, the framework is employed to collect the compressed components onto the box and coordinate them within a DSM-CC environment. One or more embodiments are used in cable and/or satellite system using a DSM-CC carousel.

Thus, in one or more embodiments, the link 805 between the carousel 802 and set-top terminal 803 can be a cable network or a satellite network.

In one or more embodiments, no changes are required to the carousel per se; rather, it is the content on the carousel that has changed. With regard to the frameworks that link to compressed pieces of code, a framework is a small kernel of decompressed code and the rest of the body of code is delivered in one or more compressed file systems.

In one or more embodiments, the STB itself has some code in it (resident code) that knows how to communicate with the carousel. It reads a file off the carousel that tells it what it should load and how it should execute the code that it finds on the carousel. The STB attaches to the carousel, reads this particular file, and now has to find and execute the framework piece. The framework piece also reads the carousel and finds each individual piece it is supposed to launch, loads them into memory, and executes them. Thus, the framework essentially takes over control of the STB.

In one or more examples, once the STB has downloaded the framework kernel, the framework takes over and reads the compressed files off the carousel, loads them into memory, and executes them. The framework kernel is software that runs on the STB. The framework takes control of the STB and obtains the compressed files from the carousel, downloads them, decompresses them, and executes them.

The compressed files may include, for example, applications needed to run on the STB, or parts of applications, and also libraries.

In some examples, in systems where the applications, parts of applications, and/or libraries can be stored on the STB and are signaled to do so, the STB will store them and when the framework runs again it will read them from the appropriate location, either the internal storage or the carousel. That is to say, it is possible to have a system without local storage and obtain what is needed from the carousel whenever the STB boots, or it is possible to have local storage as described above.

Note that in one or more embodiments, the framework may load, or re-load, components from alternate sources, once installed.

In some cases, the framework stays on the STB and obtains the components from the carousel whenever the STB boots; in some cases, the framework and the components both reside on the STB and a check is made when the STB boots to see if anything new is needed and/or if there have been any changes; and in some cases, the framework and components are always obtained from the STB every time the STB boots. By way of review and provision of additional detail, a bundle is a collection of executable code and/or resources. Typically, this is a highly cohesive set. A bundle does not have to be stand-alone. The bundle can depend on other bundles and services. A bundle is typically represented with a JAR file, is stored in compressed form, and is deployed and/or delivered in compressed form.

Figure 9:
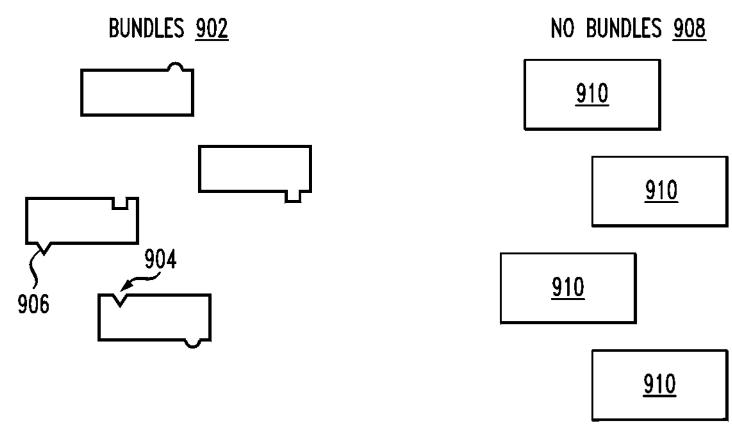
FIG. 9 illustrates bundling, according to an embodiment of the disclosure.

Attention should now be given to FIG. 9. With regard to bundles 902, in FIG. 9 each trough, e.g., 904, represents an export. Each ridge, e.g., 906, represents an import and/or dependency. Bundles assist in managing sets of code. Dependencies become apparent and can be easily resolved. In some examples, resolution can be automated.

On the other hand, in the case 908 of no bundles, imports and exports are contained within individual files, e.g., 910. Though it may appear that the modules can be organized in any arrangement, the dependencies may prohibit it. This solution requires manual effort to manage dependencies.

With regard to system dependencies, in one or more embodiments, since dependencies are described in the bundle, the framework and/or bundle loader can conditionally load bundles based on system resources. The framework can also use bundle information to conditionally load bundles based on billing, system properties, and so on.

It is advisable to avoid circular dependencies as they cause additional overhead. In at least some examples, use the registry to resolve circular dependencies (Mediator Pattern). The Mediator Pattern defines an object that encapsulates how a set of objects interact. Mediator promotes loose coupling by keeping objects from referring to each other explicitly, and it allows the programmer to vary their interaction independently. See Erich Gamma et al., Design Patterns: Elements of Reusable Object-Oriented Software, ISBN 0-201-63361-2, Addison-Wesley 1994, incorporated herein by reference in its entirety for all purposes.

With regard to the registry, the same is a similar concept as in the Microkernel architecture pattern. Pertinent concepts include the Common Object Request Broker Architecture (CORBA), which is a standard defined by the Object Management Group (OMG) that enables software components written in multiple computer languages and running on multiple computers to work together (i.e., it supports multiple platforms). The WINDOWS operating system is also pertinent in some examples. Reference is made to Pattern-Oriented Software Architecture by Frank Buschmann et al., published by Wiley, 1996, ISBN 0 471 95869 7, the complete disclosure of which is expressly incorporated herein by reference in its entirety for all purposes, and to Frank Buschmann and Kevlin Henney, Pattern-Oriented Software Architecture, OOP 2008, January 21-25, 2008, Munich, Germany, ICM—International Congress Centre Munich, the complete disclosure of which is also expressly incorporated herein by reference in its entirety for all purposes. From such references, the skilled artisan will appreciate that the Microkernel architectural pattern applies to software systems that may be able to adapt to changing system requirements. It separates a minimal functional core from extended functionality and customer-specific parts. The microkernel also serves as a socket for plugging in these extensions and coordinating their collaboration.

In one or more embodiments, both the consumer and producer share an interface, not the implementation. The producer registers the implementation of the interface. The consumer resolves the interface by using the registry to acquire the registered implementation. In one or more embodiments, there is no IXC (inter-Xlet communication), no stub generation, and no DLL instance loading. This is more efficient because it does not require the operating system to be involved. Such embodiments also do not require translation of data in order to exchange the data between the producer and consumer.

With regard to dynamic registration, in some examples, with respect to removal of the producer, in at least some examples, the registry notifies consumers and the consumers discard their references. With respect to addition of the producer, in one or more examples, the registry notifies consumers, and the consumers resolve references. This allows for bundle management.

In one or more embodiments, class loaders allow the framework to dynamically load and un-load bundles. Discarding a class loader fully discards the classes and resources of the bundle. Class loaders allow the framework to resolve bundle dependencies dynamically.

With regard to classpath, in one or more examples, every ClassLoader has a single parent class loader. In one or more embodiments, the class loader can resolve in one or more parents. Every class loader preferably has a class path; e.g., with respect to files, URLs, and directories. The class path is the URL representing the source of the classes that reside (are defined) in the class loader. Typically, there is a static set of theses URLs that define the class path. One or more embodiments make it possible to dynamically and/or programmatically modify the class path associated with a class loader.

With regard to class resolution, Java defines the process as follows:

1. Determine if the class is already loaded:
   a. See if it is loaded in the parent.
   b. See if it is loaded in the class loader.
2. If not loaded, try to resolve in the parent class loader.
3. If not in the parent, try to resolve in this class loader.

With regard to class resolution variation, in one or more embodiments, examine the exported packages. This will indicate whether the class resides in the current class loader, and/or reduce the time in attempting to load in the parent. In the case of a revision, determine if the class should reside in the current class loader. See if the class is already loaded—if resident, check the current class loader first; otherwise, check the parent first. If not loaded, if resident, load from the current class loader first. If it isn't resolved, then load from the parent. Otherwise, load from the parent. If it isn't resolved in the parent, attempt to load in the current class loader.

Figures 11, 12:
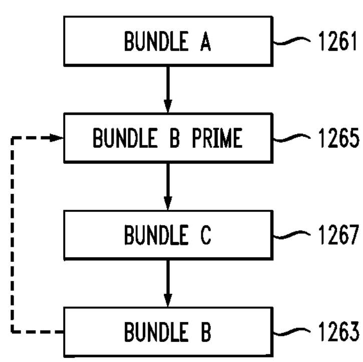
FIG. 11 shows an exemplary Ant entry, according to an embodiment of the disclosure.
FIG. 12 shows exemplary dependency substitution, according to an embodiment of the disclosure.

With regard to building a bundle, in its simplest form, the bundle is a JAR file. As such, an Ant entry, such as shown in FIG. 11, is sufficient. Tools are available that simplify this further. The following are eclipse plug-ins that will generate and deploy the jar file:

The Eclipse plug-in development environment available from The Eclipse Foundation The Knopflerfish Eclipse Plug-in available from The Knopflerfish Project.

The above tools may list exports and imports in the jar's manifest. This allows for bundle management.

The OCAP system uses IXC/Remote interfaces to produce client stubs. This requires that all IXC interfaces need to reside in the application class loader, un-bundled. IXC (Inter-Xlet Communication) is a method of exchanging data between a producer and consumer where the producer and consumer are typically not executing within the same environment and thus are not able to otherwise communicate. IXC is specific to OCAP. It causes the OCAP environment to generate method stubs for the consumer. When executed, these method stubs translate the parameter data into a form that can be transferred to a remote producer. The OCAP environment may then re-translate the transferred data to invoke a similar method provided by the producer. The results of executing the method, on the producer, are similarly translated, transferred, and decoded for the consumer.

Framework Extension

In one or more embodiments, bundles extend the run-time class path. Proposed standards can be integrated before release. Existing APIs can be mocked for testing. Emerging standards can be proven prior to submission. In at least some cases, services can be conditionally provided. Bundles may be dependent on hardware and conditionally loaded. Registration (discussed below) is used in at least some examples.

Dependency Substitution

In one or more examples, one API implementation can be substituted for another. Resolution occurs within the Class Loader. Classes are substituted during resolution. In at least some cases, the original API can be executed through mediation. The substituted API depends on the mediator which depends on the original API.

An example is presented in FIG. 12. Bundle A 1261 depends on interfaces exported by Bundle B 1263. Bundle Bprime 1265 provides the same interfaces as Bundle B 1263 and depends on bundle C 1267. Bundle C satisfies bundle Bprime's dependencies and may utilize Bundle B to do so. Bundle C thus controls Bundle A's use of Bundle B's interfaces.

This works because Bundle C resolves Bundle B's interface in Bundle Bprime. If Bprime was an OCAP API, and B was OCAP, then bundle C provides the OCAP API implementation and may use OCAP to do it (in whole or in part). The importance of this is threefold:

This provides a way to customize the behavior (and access) to standard APIs.

This allows for extension of the OCAP, and other, namespace(s). Additional functionality can be added and proved prior to specification submission. Further, the API can be provided in lieu of vendor specific implementations.

This also allows for dependency injection, which can be valuable for in-system testing.

Security

In some examples, classes can be hidden or made inaccessible. The Class Loader implementation enforces access and/or resolution. Classes can be substituted, which allows for method access control and/or behavior modification; some examples require a mediator if original functionality is to be provided.

Dynamic Loading

Class loaders can be disposed; in one or more examples, this removes all class objects and files, prevents further resolution, and/or completely reclaims memory. In at least some examples, this requires indications of addition and/or removal. References should be released on removal. References can be restored on addition.

The Registry

In one or more embodiments, the registry provides notification of bundle addition and/or removal. This allows for dynamic loading. In an addition process, a bundle registers its classes, listeners are notified of the class registration, and listeners can resolve the classes for use. In a removal process, a bundle may un-register its classes, and listeners are notified of the removal and should discard their references.

Bundle Activation

Bundle activation provides a launch point for registration and/or de-registration. The BundleActivator is similar to OSGi, a modified API to allow for OCAP XletContext. Xlet allows for OCAP application integration.

Activator Life-Cycles

With regard to Xlet, the Xlet is defined in the JAVA TV specification which is part of MHP and OCAP. Xlet life cycles are how applications are managed in the system. When an application is being loaded, whatever is doing the loading (in this case, OCAP) will call initXlet followed by startXlet. Then, if something happens, it will potentially call pauseXlet, and then destroyXlet is called when the application is no longer needed. The activator life cycle is what the framework does to decompress the components of the application. Refer to the outline below:

initXlet

Takes XletContext

Xlet may register API startXlet

Xlet may register API pauseXlet

Threads should be stopped and exclusive locks released destroyXlet

Xlet may un-register any services exported in the Registry.

With regard to Bundle Activator, the bundle activator is similar in concept to the Xlet in that it has states; a difference is that the bundle activator comes from the OSGi specification, which defines two methods for any kind of application; namely, start and stop. Refer to the OSGi Service Platform Core Specification Release 4, Version 4.2, June 2009, available from the OSGi Alliance, the complete disclosure of which is expressly incorporated herein by reference in its entirety for all purposes. One or more embodiments support both the OCAP and OSGi models. Refer to the outline below:

Start

Revised to take XletContext

Activator registers services with the Registry

Stop

Activator may un-register any exported services.

Launch Descriptor File

In one or more embodiments, this is a simple list of jar files. Each jar is examined. The manifest contains the entry point:

Main-Class: specifies the class that is the bundle activator

Import-Package: specifies dependencies

Export-Package: specifies packages provided by the bundle.

Launch-Order: specifies when the activator is invoked—"1" indicates launch prior to navigator start; otherwise, activator is launched after navigator start.

Reference should be had to FIG. 10. As noted, while one or more embodiments have been shown in the context of a cable television network, other embodiments can be implemented in the context of satellite television, which is television programming delivered via a communications satellite 1004 and received by an outdoor antenna (conventional and omitted from FIG. 10 to avoid clutter), and as far as household usage is concerned, a satellite receiver such as CPE 1006. Server 1002 can include carousel functionality as described elsewhere herein. Note that in FIG. 10, the satellite link via satellite 1004 takes the place of HFC network 101. Material may be obtained at server 1002 from a variety of sources (e.g., the link to the CPE 1006 via satellite 1004 is distinct from the concept of obtaining program material in head end 150 via satellite, as shown at 1108 in FIG. 2).

Given the discussion thus far, it will be appreciated that, in general terms, an exemplary method, according to an embodiment of the disclosure, includes the step of obtaining, at consumer premises equipment (a non-limiting example is set-top terminal 803), from a file system (a non-limiting example is digital storage media command and control (DSM-CC) object carousel 802; other examples are elements 798, 1502, and 1602), an indication that the consumer premises equipment needs to obtain at least one file from the file system. Another step includes, responsive to the consumer premises equipment obtaining the indication, obtaining, at the consumer premises equipment, from the file system, an uncompressed framework portion of the at least one file. A still further step includes executing the uncompressed framework portion of the at least one file on the consumer premises equipment. Executing the uncompressed framework portion in turn implements the steps of obtaining compressed portions of the at least one file at the consumer premises equipment, from the file system; and decompressing and executing the compressed portions of the at least one file on the consumer premises equipment.

As used in the claims, "consumer premises equipment" is intended to include traditional consumer premises equipment such as a set-top terminal 803, a "smart" television, a digital video recorder, a DOCSIS modem, a premises gateway, or the like; as well as non-traditional consumer premises equipment such as a "smart" cellular telephone or cellular-enabled tablet or laptop 1503, a "smart" internet protocol (IP) device, a personal computer 1503, or the like.

In some cases, in the step of obtaining the indication, the indication is obtained over a network such as a cable network 101 (preferably OCAP-compliant), satellite network (preferably MHP-complaint) as shown in FIG. 10; cellular network 1501 such as a 3G or 4G wireless network; IP network 1601, or the like. In such cases, the uncompressed framework portion is obtained from the file system over the network; and obtaining the compressed portions of the at least one file at the consumer premises equipment includes downloading the compressed portions of the at least one file over the network.

In one or more embodiments, the network is a video content network, such as a cable network or a satellite network; and the file system is a digital storage media command and control (DSM-CC) object carousel. In such cases, the indication and the uncompressed framework portion are obtained over the video content network, and the compressed portions of the at least one file are downloading over the video content network.

The skilled artisan will appreciate that a digital storage media command and control (DSM-CC) object carousel is a virtual file system that repeatedly delivers data in a continuous cycle; it allows data to be pushed from a broadcaster to multiple set-top box receivers by transmitting a data set repeatedly in a standard format; and it includes a file system directory structure comprising a root directory or service gateway and one or more files and directories. In a preferred embodiment, the digital storage media command and control (DSM-CC) object carousel complies with the DSM-CC specification in ISO standard ISO/IEC 13818-6:1998, expressly incorporated herein by reference in its entirety for all purposes, and any subsequent versions, amendments, and Corrigenda thereto, all of which are expressly incorporated herein by reference in their entireties for all purposes. The DSM-CC specification details how to transfer files and their structural information over an MPEG network. In some cases, the indication is detection of a change in an XAIT or AIT as defined by OCAP (typically in a user-to-user message; DSM-CC U-U protocol). The video content network is a cable network (including a "pure" cable network or an HFC network) or a satellite network.

As noted, a video content network and a DSM-CC object carousel are exemplary and non-limiting. Signaling and framework use can be implemented in a variety of contexts, such as IP-based systems, SMS cellular systems (SMS (Short Message Service) is a form of text messaging communication on phones and mobile phones) or virtual file systems such as NFS (Network File System (NFS) is a distributed file system protocol). A removable storage device can also be employed in some cases; that is to say, the file system is a thumb drive or external disk drive or the like (external to the STB or other CPE). Technicians can take dynamic code from the thumb or similar drive and load it on the box to run diagnostics. In this context, a thumb drive or the like is a virtual file system. Insertion and removal of device results in signaling that can be used to trigger the loading of the framework software.

Returning again to FIG. 7, in some examples, processor 702 is coupled to an interface (e.g., a suitable port) to an external drive 798 such as a USB drive or ESATA drive (External Serial ATA (ESATA or External Serial Advanced Technology Attachment)). In some examples, in the step of obtaining the indication, the indication is obtained from a removable storage device 798 locally coupled to the consumer premises equipment. The indication could be, for example, part of the signaling generated upon inserting the device or its cable into the appropriate port. The uncompressed framework portion, in this approach, is also obtained from the removable storage device, as are the compressed portions of the at least one file (over the local coupling such as port and cable or the like).

Refer to FIG. 16. Some instances employ IP-based systems, including virtual file systems such as Network File System (NFS), which is a distributed file system protocol that allows a user on a client computer 1603 to access files (e.g., in file system 1602) over a network (e.g., IP network 1601) in a manner similar to how local storage is accessed. Thus, in some instances, the network is an internet protocol-based network 1601; the step of obtaining the indication includes obtaining the indication over the internet protocol-based network; the step of obtaining the uncompressed framework portion includes obtaining the uncompressed framework portion over the internet protocol-based network; and the compressed portions of the at least one file are downloaded to PC 1603 or other CPE over the internet protocol-based network. NFS is, in essence, like mounting a network drive on a PC.

Short Message Service (SMS) is a text messaging service component of phone, web, or mobile communication systems, using standardized communications protocols that allow the exchange of short text messages between fixed line or mobile phone devices. Text messages can be entered into the system and routed via an IP network to an end device such as cellular phone or PC depending on how they get routed through the system. Some instances include updating files on a smart phone or 4G-connected laptop using SMS messaging. FIG. 15 shows a wireless device (could be, for example, a 3G or 4G smart phone but the example in FIG. 15 is a cellular-enabled laptop computer 1503) connected to a file system 1502 over a cellular network 1501. Accordingly, in some cases, the network is a cellular network; the step of obtaining the indication includes obtaining the indication over the cellular network; the step of obtaining the uncompressed framework portion includes obtaining the uncompressed framework portion over the cellular network; and the compressed portions of the at least one file are downloaded over the cellular network.

Thus, the same (or similar) signaling and framework can be obtained from Internet Protocol based systems, Short-Message-System (SMS) cellular systems, or virtual file systems (which are largely Internet Protocol based systems—like Network File System (NFS)). Additionally, the same (or similar) signaling and framework can be obtained via removable storage devices.

In some cases, an additional step includes storing the compressed portions of the at least one file in a persistent storage device 704 of the consumer premises equipment. The decompressing includes decompressing the compressed portions of the at least one file into a volatile memory unit 799 of the consumer premises equipment, only when needed to carry out the execution of the compressed portions of the at least one file on the consumer premises equipment.

In some instances, in the steps of obtaining the uncompressed framework portion of the at least one file and downloading the compressed portions of the at least one file, the at least one file is at least a portion of an application and/or at least a portion of a library.

In some embodiments, the obtaining of the indication, the obtaining of the uncompressed framework portion, and the executing of the uncompressed framework portion are carried out upon boot-up of the consumer premises equipment, and a further step includes repeating the obtaining of the indication, the obtaining of the uncompressed framework portion, and the executing of the uncompressed framework portion upon subsequent boot-ups of the consumer premises equipment.

In some embodiments, the obtaining of the indication, the obtaining of the uncompressed framework portion, and the executing of the uncompressed framework portion are carried out upon boot-up of the consumer premises equipment, and further steps include storing the uncompressed framework portion of the at least one file in a persistent storage device 704 of the consumer premises equipment, and, upon subsequent boot-ups of the consumer premises equipment, executing the uncompressed framework portion of the at least one file on the consumer premises equipment to: (i) download the compressed portions of the at least one file to the consumer premises equipment, over the video content network, from the digital storage media command and control (DSM-CC) object carousel; and (ii) decompress and execute the compressed portions of the at least one file on the consumer premises equipment.

In some embodiments, the obtaining of the indication, the obtaining of the uncompressed framework portion, and the executing of the uncompressed framework portion are carried out upon boot-up of the consumer premises equipment, and further steps include storing the uncompressed framework portion of the at least one file and the compressed portions of the at least one file in a persistent storage device of the consumer premises equipment, and, upon subsequent boot-ups of the consumer premises equipment, executing the uncompressed framework portion of the at least one file on the consumer premises equipment to decompress and execute the compressed portions of the at least one file on the consumer premises equipment.

In some instances, a further step includes executing the uncompressed framework portion of the at least one file on the consumer premises equipment to determine capabilities of the consumer premises equipment. In such cases, the compressed portions of the at least one file are selected in accordance with the determination of the capabilities.

In some cases, in the step of executing the uncompressed framework portion of the at least one file on the consumer premises equipment, the compressed portions of the at least one file that are downloaded are JAVA archive (JAR) files.

In some cases, a further step includes executing the uncompressed framework portion to obtain at least one additional portion of at least one additional file. See, for example, the discussion of BundleXlet elsewhere herein.

Figure 13:
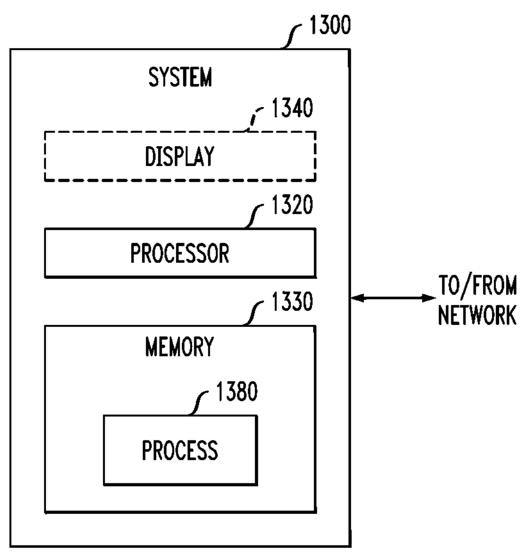
FIG. 13 is a block diagram of a computer system useful in connection with one or more embodiments of the disclosure.

In another embodiment, exemplary consumer premises equipment includes at least one hardware processor 702; and at least one memory coupled to the at least one hardware processor. The at least one hardware processor is operative to carry out or otherwise facilitate any one, some, or all of the method steps described herein. The memory could include, for example, a volatile memory such as RAM 799 and/or a persistent storage device 704. The processor could, for example, execute the distinct software modules described elsewhere herein. At least some instances of the consumer premises equipment can include a network interface such as 706 or as indicated by the "TO/FROM NETWORK" notation as shown in FIG. 13. The consumer premises equipment per se does not include the network or the file system, but is configured to interact with same.

For purposes of the following description, recall that the SILo is a collection of repositories of bundles and that each bundle represents an incremental change that can be applied to one or more devices.

A bundle is a compressed file whose contents include a combination of resource and/or executable code.

A manifest file may be included in the bundle. The manifest file names the bundle, describes the bundle's function, and provides a version for the bundle. The version information may provide the SILo with a trigger/key to determine if the bundle represents an incremental change to currently installed software.

A bundle can be uniquely identified by a combination of its bundle manifest contents and its associated dependency file. The Bundle-Name and Bundle-Version manifest properties may be used to uniquely identify a bundle.

Within a SILo repository, file names may be used to differentiate bundles from one another. This allows multiple versions of the same bundle to coexist.

Figure 17:
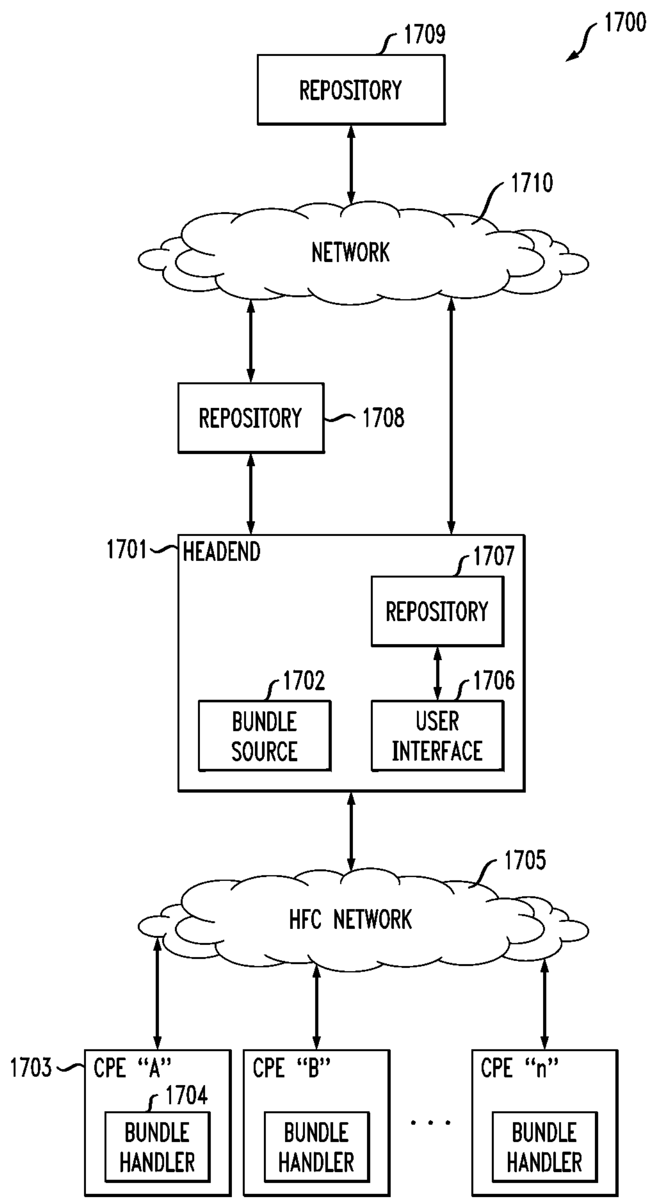
FIG. 17 is a functional block diagram illustrating an exemplary software incremental loader system configuration useful with one or more embodiments of the present disclosure.

Referring to FIG. 17, an exemplary SILo system 1700 may include a head-end 1701 including a bundle source 1702. The head-end 1701 may be in signal communication with one or more CPE devices, e.g., 1703, each including a bundle handler 1704. The head-end 1701 and CPE 1703 may be connected via a HFC network 1705. Note that FIG. 17 is a non-limiting example; in general, one or more embodiments are applicable to CPE connected with a server (in a head end or more generally in an Internet cloud location) via TCP IP; many kinds of network connectivity can be employed, such as a cable or HFC network (DOCSIS and DAVIC can, for example, be used in such cases); a satellite network, a cellular network, and so on.

The bundle handler may query the bundle source 1702 to determine whether one or more incremental changes are available for the software loaded on the CPE. The query may be performed during an application boot process.

The application boot process for the CPE includes loading a framework that understands the format and dependencies of bundles. The framework may then interrogate the CPE it is executing on, and load any bundles.

The framework, along with a default set of bundles, comprise an ODN application release. As such, each CPE boots with a current release of the ODN application.

Referring to FIG. 17, the bundle handler 1704 is a bundle loaded on the CPE 1703. After an initial boot, the bundle handler 1704 may communicate with the bundle source 1702 to identify, acquire and install any patches and or changes for the CPE it is executing on.

According to an embodiment of the present disclosure, when a number of bundles becomes large enough to warrant a new release of the ODN, a new ODN release may be deployed. This can reduce the amount of processing the SILo system performs for each CPE in the system. More particularly, in a case where multiple bundles comprise a release, and there may be multiple versions of each bundle, the number of bundles can grow exponentially. Thus, the list may become larger with each release, causing more processing for both generating and consumption of the list.

The head-end 1701 may provide a user-interface 1706 for accessing a bundle stored in a repository, e.g., 1707. A repository is a CPE accessible storage medium for bundles. The repository may be a directory on an HTTP server, an Object Carousel, etc. The repository may be local to the head-end 1707, a connected device 1708 or a remote device 1709 connected by a network 1710.

Bundles may be accompanied by a dependency file. The dependency file may indicate restrictions on the environment in which the bundle can execute.

During boot of the ODN application, the framework may compare these dependency files with its device profile to determine whether or not a particular bundle can be loaded onto the CPE.

In a similar fashion, the SILo may determine whether or not a bundle is compatible with a device profile of the CPE. The SILo may also select update(s) for the CPE, for example, in a case where there are multiple bundles available with the same name and version. According to an illustrative example of the present disclosure, updates may be selected according to location in a repository, version, dependencies, etc.

Each CPE device may have certain characteristics that relate it to other devices or groups of devices as well as providing an identity. This information can be conveyed to the SILo for processing. Some characteristics are more easily handled at the CPE. For example, multiple CPE vendors may each have multiple devices operating in a network, and each device can have a distinct model number and a plurality of system properties that describe its environment. It may be cumbersome to transmit a complete set of system properties to the SILo. It may also necessitate that the SILo have substantial knowledge of vendor specific values in order to filter bundles based on system property criteria. According to an exemplary embodiment of the present disclosure, the CPE devices can share processing the list of available bundles. In this manner, SILo can produce a coarse filtering, while the CPE devices produce a fine filtering of the available bundles.

In view of the foregoing, the SILo may include a sub-set of profile information and require the bundle handler to provide additional bundle filtering based on its unique characteristics.

Each CPE device may have a MAC address, Hub Identifier and Model Number. This information may be conveyed to the SILo for initial bundle filtering. The model number, which may be a mixture of text and numeric values, may be used to identify the manufacturer of the CPE.

According to an embodiment of the present disclosure, the bundle handler may filter bundle dependencies based on system property settings, application command-line parameters, system classes, device entitlements and the like.

The bundle handler may, optionally, provide profile information, such as a profile's name, for additional verification. The profile name can be used by SILo to determine device characteristics (e.g., legacy devices, devices having limited server functionality, and devices having extended server functionality) and refine the list of available bundles.

The bundle handler may provide SILo with a profile name in order to filter the resulting set of changes/bundles.

Figure 18:
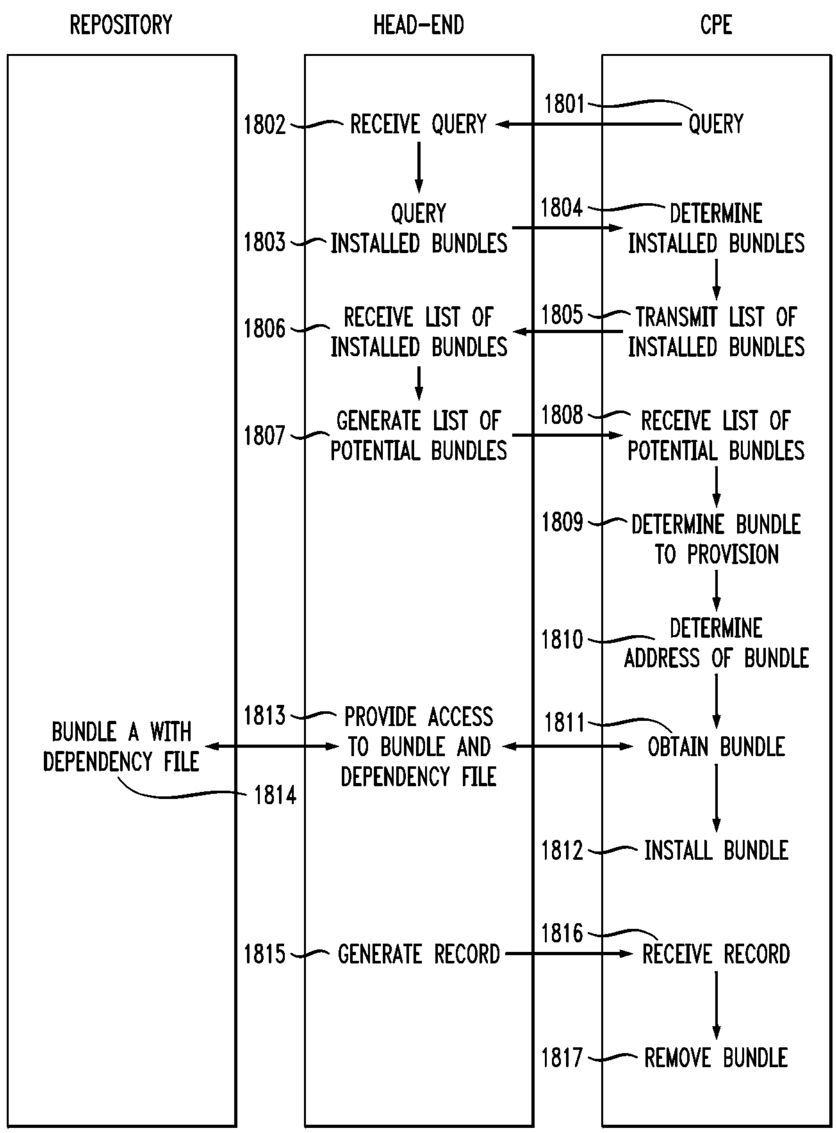
FIG. 18 is a flow diagram of a method for provisioning a consumer device according to an embodiment of the disclosure.

FIG. 18 shows an exemplary method of querying for updates. Referring to FIG. 18, the bundle handler of the CPE may periodically query the bundle source of the SILo for determining wherein an incremental change to currently installed software is available at 1801. These incremental changes may include revisions of installed software and/or additional bundles available for installation.

Upon receipt of the query at 1802, the bundle source of the SILo may query the bundle handler for a list of installed bundles at 1803, e.g., to determine if existing bundles are to be removed. This transaction may occur during a bundle handler query for bundles. As such, the bundle handler may handle multiple, concurrent, connections. In one alternative the bundle handler may post a list of installed bundles with its query.

In response to a query of the bundle source, the CPE may determine installed bundles at 1804 and transmit a list of installed bundles to the bundle source at 1805. It should be understood that the CPE's initial query may include a list of installed bundles, rendering certain actions redundant, e.g., at 1803-1806.

Stated simply, to query the SILo, the bundle handler may provide the profile information to the SILo for the CPE it is executing on to the bundle source. The bundle handler may query for a single bundle, by bundle name. The bundle handler may query for more than one bundle, e.g., all applicable bundles based on the profile information.

Upon receipt of the list of installed bundles at 1806, the bundle source may generate a list of potential bundles at 1807.

Furthermore, the bundle source may determine bundles to be removed. In one alternative, the bundle handler may determine bundles to be removed from the CPE. This information can be conveyed to the CPE in a record generated by SILo 1815. In response to the receipt of the record 1816, the CPE can remove a bundle 1817 identified in the record.

When a query is made, the bundle source may respond with an error code, or all available bundles that match the query and device profile. The response may include information enabling the bundle handler to further refine the results (e.g., the bundle's dependencies) as well as acquire the bundle.

Upon receipt of the list of potential bundles at 1808, the bundle handler may optionally select which bundles to provision at 1809, and determine the address(es) of the bundles stored in the repositories (sub-repositories) at 1810. Once the address information is obtained, the bundle handler may obtain one or more bundles at 1811 and provision the bundles at the CPE at 1812.

Referring now to the refinement of query results, the SILo may utilize information provided by the bundle handler to filter available bundles. The bundle source interprets the device information (e.g., including any bundle name, bundle version, MAC address, Hub Id and model number) to determine applicable bundles. For example, according to an exemplary embodiment, the SILo may grant CPE access only to certain repositories. e.g., repositories in a specific geographic area, based on the information provided. For example, some CPE devices may not have access certain repositories due to technological limitations, e.g., devices having low available bandwidth. SILo can restrict these devices from obtaining bundles from repositories that can only be accessed by HTTP (or other Internet based protocol).

The bundle source may make use of other systems to refine the results. For example, the bundle source may use the MAC address to query entitlements or account information related to the device. This may allow the bundle source to restrict bundles to geographic location by account status or similar related information.

Referring to the discovery of repositories, the location of the SILo may be a well-known location to the CPE, e.g., propagated through Internet or domain registries. The URL specifying this location may be configurable for development. It may also be able to be overridden for special deployment needs.

The SILo location may be listed in the manifest file for the bundle handler bundle. This location may be overridden by application command line argument. Further, any location specified in the MSO catalog may be used in place of any other setting.

Further, the SILo may initiate a download to one or more CPEs (e.g., by a push operation). Further, the SILo may remove bundles from one or more CPEs without being polled by the bundle handler.

In one example, the current ODN implementation provides an HTTP server through which bundles can be managed manually. This service can be extended to receive SILo requests. The extension can follow simple RESTful interfaces. The SILo can use HTTP Post requests—as is done through the existing web interface—to push bundles to the bundle handler/device. The SILo may use HTTP Delete requests to remove bundles from the Bundle handler/device. The SILo may use HTTP Put requests to update bundles on the device.

In the case where a bundle is pushed to the device, the bundle handler may assume that the dependencies are suitably met. As such, it is not necessary to provide any dependency information for the bundle. The SILo may insure that the target device meets the dependencies for the pushed bundle. These dependencies may be resolved through user interaction. The SILo may push dependent bundles.

Referring to a bundle handler-bundle source protocol, the protocol may support various forms of communication, e.g., for test. More particularly, the protocol may allow testing with and without a connected CPE. Further, the protocol may be secure, preventing un-authorized access when deployed.

A set of HTTP encoded URLs may then be used to test the SILo. The SILo software may return a set of information that describes applicable bundles based on the HTTP request message.

Referring to the query request (e.g., FIG. 18, at 1801), a query may be sent from the bundle handler to the bundle source/SILo to obtain a list of bundles. The following exemplary Extended BNF grammar illustrates a formatted query request, transmitted via HTTP Get:

<Query> ::=<URL>,“?q=”,<QueryString>|
<URL>,“?q=”,<QueryString>,“&”,<Profile>;
<URL> ::=“http://”,<serverIP>,“/”,<applicationID>;
<Profile>::=“m=”,<model>,“&h=”,<hubID>,“&a=”, <mac>[,“&”,<profileSpec>]|
<profileSpec>;
<profileSpec> ::=“p=”,<profileName>;
<QueryString> ::=“*”|<bundleNameList>;
<bundleNameList> ::=<bundleName>,“,”,<bundleNameList>|
<bundleName>;
<bundleName> ::=<string>;
<model> ::=<string>;
<string> ::=[A . . . Z,a . . . z,0 . . . 9,-,_]?;
<hubID> ::=<integer>;
<applicationID> ::=<string>;
<serverIP> ::=<integer>,“.”,<integer>,“.”,<integer>,“.”, <integer>;
<mac> ::=[a . . . f,0 . . . 9]{12};
<integer> ::=[0 . . . 9]?;
<profileName> ::=<string>;

To facilitate parsing at the SILo, the client bundle handler may process its own command line dependencies. This may be useful in a case where the command line format varies and may require additional processing. Further, processing the command line at the SILo may create an unneeded coupling between the server implementation and the application.

The SILo can recognize various profile names. Should no profile be given, the SILo may return information for all bundles in the repository.

Query results (e.g., FIG. 18 at 1807) may be returned to a bundle handler from a bundle source. The bundle source previously received a query request from the bundle handler.

The query results may be encoded in XHTML or another available format. The results may be interpreted by the CPE, a web browser or another devices, e.g., for testing.

Exemplary XHTML mapping:

<html><head><title>results</title></head><body>
<ul name=“q.results”>
<li><div name=“q.result”>
<a name=“b.location” href=“jarLocation”>jarName</a>
<pre name=“b.manifest”>
<!- -line from manifest file- ->
. . .
</pre>
<pre name=“b.dependencies”>
<!- -line from dependency file- ->

```
. . .
</pre>
</div></li>
. . .
</ul>
</body></html>
```

Above, lines from the manifest and dependency files may be directly inserted into the resulting XHTML. This allows the CPE to utilize its existing parsing mechanism for parsing properties. Further, this may simplify the generation and consumption of the XML.

Note that the HTML, HEAD, TITLE and BODY tags may be omitted for most browsers. The contents will be formatted in an unordered list format.

The 'href' location of the bundle may represent an HTTP accessible server, or an OCAP carousel locator (with ID).

Referring to a request for removal of a bundle, the bundle source may send a Remove/Delete request to a bundle handler.

As noted herein, the head-end or bundle handler may provide an HTTP interface through which a CPE or bundle source may acquire a current list of bundles on the device. This list may include the bundle's name, version and filename/locator.

If the bundle handler queries for all bundles, the bundle source may request a list of current bundles from the Bundle handler's device. The bundle source may then issue an HTTP Delete request, to the bundle handler, for the bundles that should be removed from the bundle handler's device. The HTTP Delete requests should not occur during the processing of query results. That is, the HTTP Delete requests may occur in the current bundle handler-bundle source session.

To allow for the bundle source to query the bundle handler, the bundle handler may be deployed in a multi-concurrent web server.

The HTTP Delete request may include a list of the bundles (e.g., by bundle name) to be removed. The list of bundles may be semi-colon separated with no white space between entries. The bundle source may send multiple Delete requests with one or more bundle names specified. The list of bundle names may appear in the request's Request-URI field.

As described herein, the CPE may receive pushed data. In this example, a bundle source sends a Post/Put HTTP request to a bundle handler. This message contains the binary data that defines the bundle.

The format of an HTTP Push message may be the same as an HTTP Post message, with the exception of the method field in the header.

The CPE or bundle handler, upon receiving these messages, may create a bundle from the appropriate message part. The bundle handler may then remove any bundle that shares the same 'Bundle-Name' (property in the manifest file) as the received bundle.

The received bundle is then added to the group (of currently executing bundles), and activated.

The bundle handler may treat Post and Push requests the same. This will allow the same processing of bundle source and Web Page/Browser generated messages.

Referring now to the submission of bundles to the SILo and in particular FIG. 18, the SILo may provide a user interface at 1813 such that HTTP post requests result in a bundle being added to one or more repositories 1814. The HTTP post includes both the bundle's dependency file and the bundle itself. Further, the filename for the bundle may be specified in the URL used in the post request.

The SILo may receive, store and process the submitted bundles and their dependency files. Permissions may be given to allow storage to the local file system of the repository.

Processing of the dependency and manifest files may be deferred until bundles are queried at 1801.

The bundle handler of the CPE may not be allowed to submit bundles to the SILo for storage.

Dependency file names may be the same as their associated bundle, with the exception of their extension. Dependency files may end with a specific extension, such as '.dep' . Bundles may end in a '.jar' extension. For example: BundleX.jar has a dependency file named BundleX.dep. The SILo may enforce this or another naming convention.

The SILo may provide a user interface through which bundles can be added and/or removed. The HTTP Delete method may be used to remove bundles from the SILo. However, HTML may not map the delete method to a form. As such, a form submission may result in an HTTP Get request. For this reason, the bundle source and SILo UI web applications may be separated.

Bundle handlers may communicate with the SILo through the bundle source. This communication may be via REST (Representational State Transfer). Bundle handlers may not be allowed to remove bundles from, or add bundles to, the SILo.

Any deletion of a bundle may also result in the removal of its associated dependency file (see naming conventions above). Deletions of bundles may result in the bundle's removal from connected bundle handlers. This deletion may be deferred until the bundle handler next connects to (queries) the SILo.

To track the health of each CPE or STB, the bundle handler service may report the failure, of load attempts, periodically. This may occur after any scheduled poll that results in the attempt to load new bundles.

Only failures may be reported as successful loads, and the state of the CPE, can be obtained by querying the bundle handler for the currently loaded bundles.

The bundle handler may generate a report after an attempt to load each bundle has been made. The report may be a summary of all attempts that had failed during the current polling cycle.

A bundle handler service of the CPE may attempt to load a bundle multiple times, e.g., up to 3 times, before considering the load as failed. Retry attempts may be synchronous. The bundle handler may attempt to load each bundle, including any retry attempts, in the order presented in the query response. One of ordinary skill in the art would appreciate that out of order processing can also be used.

Status reports may be delivered from the bundle handler service (CPE or STB) to the SILo bundle source service. The report may be transmitted via HTTP Post request.

The content, of the report, may be formatted in XHTML and carry the content type of 'application/xhtml+xml' .

The report XML may be in the following form:

```
<html><head><title>failure repot</title></head><body>
<ul name="q.results">
<li><div name="q.result">
<a name="b.location" href="jarLocation">jarName</a>
<pre name="b.result">Error Message</pre>
</div></li>
. . .
</ul>
</body></html>
```

Encoding in XHTML eliminates the need for constructing a new Data Type Definition and for defining a new namespace for the documents. Further, XHTML may allow for debugging and testing using common browsers to view the information. The format may be similar to the query result format to limit the amount of processing on the STB.

The 'Error Message' may indicate the reason for failure, if available. This may be accompanied by a stack trace—if the failure is the result of an exception.

When status reports are received by the bundle source they may be stored for further processing.

According to an embodiment of the present disclosure, the CPE's web server may be multi-concurrent. The bundle handler may query the bundle source during query request processing.

According to an embodiment of the present disclosure, the CPE, SILo or repositories may report storage in a database. These reports may be used to generate metrics.

Alternate Query Result Encodings.

XML encoding:

```
<results>
<result>
  <bundleLocation>url</bundleLocation>
  <manifest>
    <!- -manifest file contents, unformatted- ->
  </manifest>
    <dependencies>
      <!- -dependency file contents, unformatted- ->
    </dependencies>
</result>
</results>
```

Above, the manifest and dependency file contents may be copied directly into the XML—unformatted. This allows the CPE to use its current parsing methods and may simplify the production and consumption of the XML.

XML parsing may be cumbersome to the CPE. In such a case a text based representation may be created:

```
Bundle_start
Location=<url>
Manifest_start
<line from manifest file>
Manifest_end
Dependency_start
<line from dependency file>
Dependency_end
Bundle_end
```

Each delimiter is terminated by a new line. Again, the Manifest and dependency information is copied directly into the message.

Referring now to rollback notifications, the CPE can be rolled back to a prior revision by editing the dependency files for versions of a bundle. A manual process may that a bundle is deleted from one or more set tops. Subsequently, another bundle may be added to one or more set tops in its place.

If the removed bundle is still present in the repository, it may be re-loaded by the CPE—due to its version number. However, manipulating the dependency files, or removing the bundle being rolled back, may prevent a re-load of the bundle.

A method to automate such activity is to present roll-back records in response to a query made by the bundle handler. The bundle source may present such records for every query made, regardless of whether or not the query contains other results. To facilitate easier processing, the records may be presented at the top of the results list.

Each rollback record is encoded in the same manner as the query results. The XHTML encoding of the rollback may be a sub-list, presented as a list item, in the query results.

For example:

```
<ul name="q.results">
<li><ul name="q.rollback"><li><div name="q.from">
<a href="http://10.143.4.169/repo">cometd</a></div></li>
<li><div name="q.result">
<a href="http://10.143.4.169/repo">preluderesources</a>
<pre name="b.manifest">Manifest-Version: 1.0
Export-Package: com.twc.ocap.prelude
Launch-Priority: 0
Bundle-Name: PreludeResources
Created-By: 1.5.0_17-b04 (Sun Microsystems Inc.)
Launch-Stage: finishStartup
Ant-Version: Apache Ant 1.8.1
Bundle-Vendor: TWC
Bundle-Version: 1.0.0
Bundle-Activator: com.twc.ocap.prelude.PreludeResourceActivator
Bundle-ManifestVersion: 2
Bundle-SymbolicName: PreludeResources
Import-Package:
</pre><pre name="b.dependencies">Exclude-Model: 8300 8240 4240 4250 4300
SMT-H3050
</pre></div></li></ul></li>
<li><div name="q.result">
<a href="http://10.143.4.169/repo">preluderesources</a>
<pre name="b.manifest">
Manifest-Version: 1.0
Export-Package: com.twc.ocap.prelude
Launch-Priority: 0
Bundle-Name: PreludeResources
Created-By: 1.5.0_17-b04 (Sun Microsystems Inc.)
Launch-Stage: finishStartup
Ant-Version: Apache Ant 1.8.1
Bundle-Vendor: TWC
Bundle-Version: 1.0.0
Bundle-Activator: com.twc.ocap.prelude.PreludeResourceActivator
Bundle-ManifestVersion: 2
Bundle-SymbolicName: PreludeResources
Import-Package:
</pre><pre name="b.dependencies">Exclude-Model: 8300 8240 4240 4250 4300
SMT-H3050
</pre></div></li></ul>
```

Above, the 'q.rollback' element may be listed as an item of the query results. In this example, the 'q.rollback' record (roll-back record) has at most 2 list items.

The first list item is the 'q.from' record, which indicates the name of the bundle file, with its location. The bundle handler service may determine if the CPE has this particular bundle loaded—that is, the CPE contains the bundle file loaded from the given location. If the CPE does not contain the file, the roll-back record may be ignored. Otherwise, the bundle handler may evaluate the second list item of the roll-back record.

The second list item, of the roll-back record, is a bundle result. The bundle handler evaluates the dependencies and/or manifest entries to determine if the bundle is applicable to the CPE's environment. If so, and the CPE has the 'q.from' bundle loaded, the bundle handler may remove the bundle defined in the 'q.from' item, and acquire and install the bundle referenced in the 'q.result' roll-back record list item.

The SILo user interface may provide controls for defining and managing roll-back records. Definition of a roll-back record may result in the deletion of a bundle from a SILo repository.

In view of the foregoing, and not by way of limitation, one or more of the following technical advantages may result from an implementation of embodiments of the present disclosure. In one or more embodiments, a list of incremental changes may reside in one location, while the bundles may be located in one or more locations, including one or more HTTP servers and one or more object carousels. In one or more embodiments, the bundles may be located in one or more locations, including one or more HTTP servers and one or more object carousels. In one or more embodiments, incremental updates may be pushed to the CPE device through the use of a registration process. In one or more embodiments, the dispersion of bundles in different locations may enable restrictions on which CPEs can have access to which bundles. In one or more embodiments, object carousels may enable efficient use of bandwidth and/or large applications to be provisioned. For example, repositories, such as HTTP based repositories, can be accessed via a protocol transaction. The protocol transaction may require that clients and servers negotiate the transfer of information. In this example, an object carousel can be used as a broadcast mechanism that continually transfers the information to all connected devices. The broadcast mechanism can reduce or eliminate the overhead involved with each client having to negotiate with a common server. Thus, less network bandwidth may be used and more clients can access the bundles. In one or more embodiments, incremental changes may be scheduled, or delayed. In one or more embodiments, the process of incremental update does not include a re-boot process.

Recapitulation

Reference should now be had to flow diagram of FIG. 18. Given the discussion thus far, it will be appreciated that, in general terms, an exemplary method, according to an aspect of the invention, includes communicating, by consumer premises equipment, identification information to a software management system via a network interface at block 1801, receiving, by the consumer premises equipment, a list of bundles in response to communicating the identification information to the software management system via the network interface at block 1808, determining, by the consumer premises equipment, a location of a repository storing at least one bundle in the list at block 1810, wherein the software management system includes a plurality of repositories storing a plurality of bundles at different locations, and installing, by the consumer premises equipment, the at least one bundle from the repository having the location at block 1812.

In some cases the identification information is periodically communicated at 1801.

In some cases the identification information includes a list of installed bundles on the consumer premises equipment such as at 1805.

In some cases the communication of the identification information further comprises querying the software management system for a specific bundle such as at 1801.

In some cases the communication of the identification information further comprises querying the software management system for all bundles associated with the identification information such as at 1801.

In some cases the method includes updating the consumer premises equipment by replacing a previously installed bundle with the at least one bundle such as at 1812.

In some cases, the at least one bundle at 1811 represents a rollback of a software component of the consumer premises equipment such as at 1812.

In some cases, the at least one bundle at 1811 is a new software component of the consumer premises equipment.

In some cases the method includes removing at least one bundle at 1817 from the consumer premises equipment in response to a record at 1816 received by the consumer premises equipment in response to the communication of the identification information at 1801.

In some cases the method includes resolving dependencies of installed bundles on the consumer premises equipment and the at least one bundle at 1812.

Referring again to the flow diagram of FIG. 18, an exemplary method, according to an aspect of the invention, includes receiving, by a central repository, identification information of a consumer premises equipment via a network interface at block 1802, and generating, by the central repository, a list of bundles stored in one or more sub-repositories in response to receiving the identification information via the network interface at block 1807, wherein the one or more sub-repositories are in signal communication with the central repository.

In some cases the identification information is periodically received at 1802.

In some cases the identification information includes a list of installed bundles on the consumer premises equipment at 1806.

In some cases the receiving of the identification information further comprises receiving a query for a specific bundle at 1803.

In some cases the receiving of the identification information further comprises receiving a query for all bundles associated with the identification information at 1801.

In some cases the method includes indicating that the at least one bundle currently installed by the consumer premises equipment is to be removed at 1815.

Reference should now be had to the diagram of FIG. 17 and the flow diagram of FIG. 18. Given the discussion thus far, it will be appreciated that, in general terms, an exemplary software management system includes a first central repository 1701 of FIG. 17, a plurality of sub-repositories, e.g., 1707, 1708 and/or 1709 of FIG. 17, in signal communication with the first central repository, a plurality of bundles stored in different ones of the sub-repositories by the first central repository, wherein each bundle is associated with a description, and a computer program product embodying instructions executable by the first central repository to perform a method for receiving identification information of a consumer premises equipment at block 1802 of FIG. 18 and generating a list of bundles for the consumer premises equipment selected from the bundles stored in different ones of the sub-repositories based on the identification information at block 1807 of FIG. 18, wherein the bundles include information for installing incremental updates to the consumer premises equipment.

In some cases the description indicates dependencies between an associated bundle and at least one other bundle at 1807 of FIG. 18.

In some cases a second central repository is chained to the first central repository, e.g., 1701 and 1708 of FIG. 17.

System and Article of Manufacture Details

The invention can employ hardware or a combination of hardware and software. Software may include, but is not limited to, firmware, resident software, microcode, etc. One or more embodiments of the disclosure or elements thereof can be implemented in the form of an article of manufacture including a machine readable medium that contains one or more programs, which when executed implement such step(s); that is to say, a computer program product including a tangible computer readable recordable storage medium (or multiple such media) with computer usable program code configured to implement the method steps indicated, when run on one or more processors. Furthermore, one or more embodiments of the disclosure or elements thereof can be implemented in the form of an apparatus including a memory and at least one processor that is coupled to the memory and operative to perform, or facilitate performance of, exemplary method steps.

According to one or more embodiments of the disclosure, various elements may be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

FIG. 13 is a block diagram of a system 1300 that can implement at least some embodiments of the disclosure, and is representative, for example, of the servers shown in the figures. The processor, memory, and process are also representative of embodiments of the functionality of set-top terminals, and the like. As shown in FIG. 13, memory 1330 configures the processor 1320 to implement one or more methods, steps, and functions (collectively, shown as process 1380 in FIG. 13) described herein. The memory 1330 could be distributed or local and the processor 1320 could be distributed or singular. Different steps could be carried out by different processors.

The memory 1330 could be implemented as an electrical, magnetic or optical memory, or any combination of these or other types of storage devices. It should be noted that if distributed processors are employed, each distributed processor that makes up processor 1320 generally contains its own addressable memory space. It should also be noted that some or all of computer system 1300 can be incorporated into an application-specific or general-use integrated circuit. For example, one or more method steps could be implemented in hardware in an ASIC rather than using firmware. Display 1340 is representative of a variety of possible input/output devices (e.g., keyboards, mice, and the like). Every processor may not have a display, keyboard, mouse or the like associated with it.

As is known in the art, part or all of one or more embodiments of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 1300 or processing capability on a firewall, intrusion prevention system, or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present disclosure can include a computer program comprising computer program code means adapted to perform one or all of the steps of any methods or claims set forth herein when such program is run, for example, on the server 600, set-top terminal 106, 803, or the like, and that such program may be embodied on a tangible computer readable recordable storage medium. As used herein, including the claims, a "server" includes a physical data processing system (for example, system 1300 as shown in FIG. 13) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module which communicates identification information to a software management system via a data over cable service interface, a second module which receives a list of bundles in response to communicating the identification information to the software management system via the data over cable service interface, a third module which determines a network address of a repository storing at least one bundle in the list, wherein the software management system includes a plurality of repositories storing a plurality of bundles at different network addresses, and a fourth module which installs the at least one bundle from the repository having the network address. In another non-limiting example, the modules include a first module which receives identification information of a consumer premises equipment via a data over cable service interface, and a second module which generates a list of bundles stored in one or more sub-repositories in response to receiving the identification information via the data over cable service interface, wherein the one or more sub-repositories are in signal communication with the central repository. The method steps can then be carried out using the distinct software modules of the system, as described above, executing on one or more hardware processors (e.g., a processor or processors in a server 600, processor such as 702 in set-top box 106, 803; processor 1320, and the like). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the disclosure can include a computer program including computer program code means adapted to perform one or all of the steps of any methods or claims set forth herein when such program is implemented on a processor, and that such program may be embodied on a tangible computer readable recordable storage medium. Further, one or more embodiments of the present disclosure can include a processor including code adapted to cause the processor to carry out one or more steps of methods or claims set forth herein, together with one or more apparatus elements or features as depicted and described herein.

Although illustrative embodiments of the present disclosure have been described herein with reference to the accompanying drawings, it is to be understood that the disclosure is not limited to those precise embodiments, and that various other changes and modifications may be made by one skilled in the art without departing from the scope or spirit of the disclosure.

What is claimed is:

1. A method comprising the steps of:

communicating, by consumer premises equipment, identification information and a list of installed bundles to a software management system via a network interface, wherein each of the installed bundles has registered classes thereof in a file registry of the consumer premises equipment;

receiving, by the consumer premises equipment, a list of available bundles in response to communicating the identification information and the list of installed bundles to the software management system via the network interface, wherein the available bundles are stored in a compressed form in a virtual file system in a plurality of object carousel repositories remote from the consumer premises equipment;

selecting, by a bundle handler of the consumer premises equipment, at least one, but less than every bundle of the available bundles to be installed on the consumer promises equipment, wherein the selection comprises resolving, by the bundle handler, at least one dependency of the available bundles using the file registry of the registered classes of the installed bundles, wherein the selecting returns at least one selected bundle from among the available bundles;

extracting, by the consumer premises equipment from the at least one selected bundle, a location of each of the object carousel repositories storing the at least one selected bundle;

obtaining, by the consumer premises equipment, in compressed form, the at least one selected bundle from respective ones of the plurality of object carousel repositories storing the at least one bundle to be installed using the location extracted from the available bundles, wherein the software management system includes the plurality of object carousel repositories storing the available bundles at different locations; and installing, by the consumer premises equipment, the at least one selected bundle obtained from the respective ones of the plurality of object carousel repositories using the location extracted by the consumer premises equipment, including decompressing the at least one selected bundle.

2. The method of claim 1, wherein the identification information is periodically communicated by the consumer premises equipment to the software management system.

3. The method of claim 1, wherein the communication of the identification information further comprises querying the software management system for a specific bundle.

4. The method of claim 1, wherein the communication of the identification information further comprises querying the software management system for all bundles associated with the identification information.

5. The method of claim 1, further comprising updating the consumer premises equipment by replacing a previously installed bundle with the at least one selected bundle.

6. The method of claim 5, wherein the at least one selected bundle represents a rollback of a software component of the consumer premises equipment.

7. The method of claim 1, wherein the at least one selected bundle comprises a manifest file and an executable code.

8. The method of claim 1, further comprising removing, by the bundle handler of the consumer premises equipment, at least one of the installed bundles from the consumer premises equipment in response to a record received by the consumer premises equipment in response to the communication of the identification information.

9. A method comprising the steps of:

storing a plurality of bundles, wherein the bundles are each stored in one or more sub-repositories of a plurality of sub-repositories, at least two of the sub-repositories having different locations, wherein at least one of the sub-repositories is an object carousel storing respective ones of the bundles in a compressed form in a virtual file system;

receiving, by a central repository, identification information of a consumer premises equipment and a list of installed bundles on the consumer premises equipment via a network interface;

generating, by the central repository using a first filtering of the bundles, a list of two or more of the bundles stored in the plurality of sub-repositories in response to receiving the identification information and the list of installed bundles via the network interface, wherein the central repository generates the list of two or more bundles using a dependency between the installed bundles and at least one of the two or more bundles of the list of bundles, wherein at least two of the bundles in the list are stored in the compressed form in the virtual file system in different ones of the at least two sub-repositories having different locations; and providing, to the consumer premises equipment, access to the list of bundles generated by the central repository, wherein the list of bundles includes an application locator defining a path to each bundle in the list, and wherein at least one, but less than every bundle in the list is selected for installation using a second filtering, performed by a bundle handler executing on the consumer premises equipment, of at least two of the bundles from the list having respective paths corresponding to at least two of the sub-repositories having different locations to provide access to the at least two sub-repositories storing the at least two bundles corresponding to the second filtering, said second filtering using dependency information of the bundles in the list and dependency information of the installed bundles on the consumer premises equipment, wherein the consumer premises equipment obtains the at least one bundle selected for installation using a respective one of the paths given in the list of bundles.

10. The method of claim 9, wherein the identification information is periodically received.

11. The method of claim 9, wherein the receiving of the identification information further comprises receiving a query for a specific bundle.

12. The method of claim 9, wherein the receiving of the identification information further comprises receiving a query for all bundles associated with the identification information.

13. The method of claim 9, further comprising generating and communicating a record to the consumer premises equipment indicating that the at least one bundle currently installed by the consumer premises equipment is to be removed.

14. A software management system comprising:

a non-transitory first central repository;

a plurality of non-transitory sub-repositories in signal communication with the first central repository storing a plurality of bundles, wherein the bundles are each stored in a compressed form in a virtual file system on object carousels of one or more of the plurality of sub-repositories by the first central repository, wherein each bundle of the plurality of bundles is associated with a description; and a processor of a computer program product including the first central repository to perform a method for receiving identification information of a consumer premises equipment and a list of installed bundles on the consumer premises equipment, generating, using a first filtering of available bundles, a list of two or more of the bundles for the consumer premises equipment selected from the plurality of bundles based on the identification information and dependency information for the installed bundles of the consumer premises equipment, wherein the processor generates the list of bundles based on at least one dependency between the installed bundles and at least one other bundle of the list of bundles, wherein the list of bundles generated by the processor includes respective address information for the bundles in the list of bundles generated by the processor and stored in the compressed form in the virtual file system on respective ones of the object carousels of the sub-repositories, wherein the bundles in the list of bundles generated by the processor include information for installing incremental updates to the installed bundles of the consumer premises equipment and providing, to the consumer premises equipment, access to the list of bundles generated by the processor, and wherein the processor is responsive to a selection, using a second filtering, received from the consumer premises equipment of at least two of the bundles from the list having respective addresses corresponding to at least two of the sub-repositories having different locations to provide access to the at least two sub-repositories storing the at least two bundles corresponding to the selection.

15. The software management system of claim 14, further comprising a second central repository chained to the first central repository.

* * * * *